US011025762B2

(12) United States Patent
Ackeret et al.

(10) Patent No.: US 11,025,762 B2
(45) Date of Patent: Jun. 1, 2021

(54) HOLDER FOR FLAT, APPROXIMATELY RECTANGULAR DEVICES, SUCH AS TABLET COMPUTERS OR SMARTPHONES

(71) Applicant: KINETIX AG, Glarus (CH)

(72) Inventors: Peter Ackeret, Zurich (CH); Michael Andreas Keller, Freudenstadt (DE); Florian Meyer, Haimhausen (DE)

(73) Assignee: KINETIX AG, Glarus (CH)

( * ) Notice: Subject to any disclaimer, the term of this patent is extended or adjusted under 35 U.S.C. 154(b) by 217 days.

(21) Appl. No.: 15/501,650

(22) PCT Filed: Aug. 6, 2015

(86) PCT No.: PCT/EP2015/068166
§ 371 (c)(1),
(2) Date: Feb. 3, 2017

(87) PCT Pub. No.: WO2016/020480
PCT Pub. Date: Feb. 11, 2016

(65) Prior Publication Data
US 2017/0237843 A1    Aug. 17, 2017

(30) Foreign Application Priority Data

Aug. 7, 2014   (CH) .................................... 01199/14
Sep. 12, 2014  (CH) .................................... 01384/14
(Continued)

(51) Int. Cl.
*H04M 1/04* (2006.01)
*H04B 1/3888* (2015.01)
(Continued)

(52) U.S. Cl.
CPC .............. *H04M 1/04* (2013.01); *B60R 11/02* (2013.01); *B60R 11/0241* (2013.01);
(Continued)

(58) Field of Classification Search
CPC ...... H04M 1/04; G06F 1/1626; G06F 1/1632; B60R 11/0241; B60R 11/02;
(Continued)

(56) References Cited

U.S. PATENT DOCUMENTS 5,251,771 A    10/1993  Hotsumi et al.
9,584,890 B1 *  2/2017  Tuccinardi ............... H04R 5/04
(Continued)

FOREIGN PATENT DOCUMENTS

FR    2981820      4/2013
WO    2014068146   5/2014

OTHER PUBLICATIONS

English Language Abstract of FR2981820A1.

*Primary Examiner* — Lester G Kincaid
*Assistant Examiner* — Maryam Soltanzadeh
(74) *Attorney, Agent, or Firm* — Ware, Fressola, Maguire & Barber LLP

(57) ABSTRACT

A holder is provided for releasably securing a flat device, such as a tablet computer or a smartphone, to a component, in particular a component of a motor vehicle. The holder comprises a mounting which can be secured to the component and a holder frame which can be releasably secured to the mounting for receiving the device. The mounting comprises a carrier having first connection elements, and the holder frame has second connection elements at two opposite edges. The first and second connection elements are designed in a complementary manner with respect to each other such that the first and second connection elements interlock for the purpose of mutual fixing when the holder frame is inserted into the mounting such that the holder frame cannot be moved out of the mounting in the holder frame plane and/or perpendicularly to the holder frame plane.

27 Claims, 32 Drawing Sheets

(30) Foreign Application Priority Data

| Sep. 14, 2014 | (CH) | 01392/14 |
| --- | --- | --- |
| Oct. 7, 2014 | (CH) | 01529/14 |
| Nov. 16, 2014 | (CH) | 01771/14 |
| Dec. 3, 2014 | (CH) | 01866/14 |
| Dec. 31, 2014 | (CH) | 00003/15 |
| Feb. 25, 2015 | (CH) | 00264/15 |
| May 8, 2015 | (CH) | 00650/15 |
| Jun. 15, 2015 | (CH) | 00868/15 |

(51) Int. Cl.
*B60R 11/02* (2006.01)
*G06F 1/16* (2006.01)
*B60R 11/00* (2006.01)

(52) U.S. Cl.
CPC ........ *B60R 11/0252* (2013.01); *G06F 1/1632* (2013.01); *H04B 1/3888* (2013.01); *B60R 2011/0003* (2013.01); *B60R 2011/0071* (2013.01); *B60R 2011/0078* (2013.01); *B60R 2011/0084* (2013.01); *B60R 2011/0089* (2013.01)

(58) Field of Classification Search
CPC ......... B60R 11/0252; B60R 2011/0071; B60R 2011/0089; B60R 2011/0084; B60R 2011/0003; B60R 2011/0078; H04B 1/3888
See application file for complete search history.

(56) References Cited

U.S. PATENT DOCUMENTS

| 2002/0195771 | A1 | 12/2002 | Ku | |
| --- | --- | --- | --- | --- |
| 2012/0224323 | A1* | 9/2012 | Yang | F16M 11/041 |
| | | | | 361/679.55 |
| 2013/0148273 | A1* | 6/2013 | Tsai | H04M 1/04 |
| | | | | 361/679.01 |
| 2013/0200119 | A1* | 8/2013 | Ackeret | B60R 11/0235 |
| | | | | 224/275 |
| 2013/0318775 | A1 | 12/2013 | Peters | |
| 2014/0042285 | A1* | 2/2014 | Carnevali | F16M 13/00 |
| | | | | 248/316.4 |

* cited by examiner

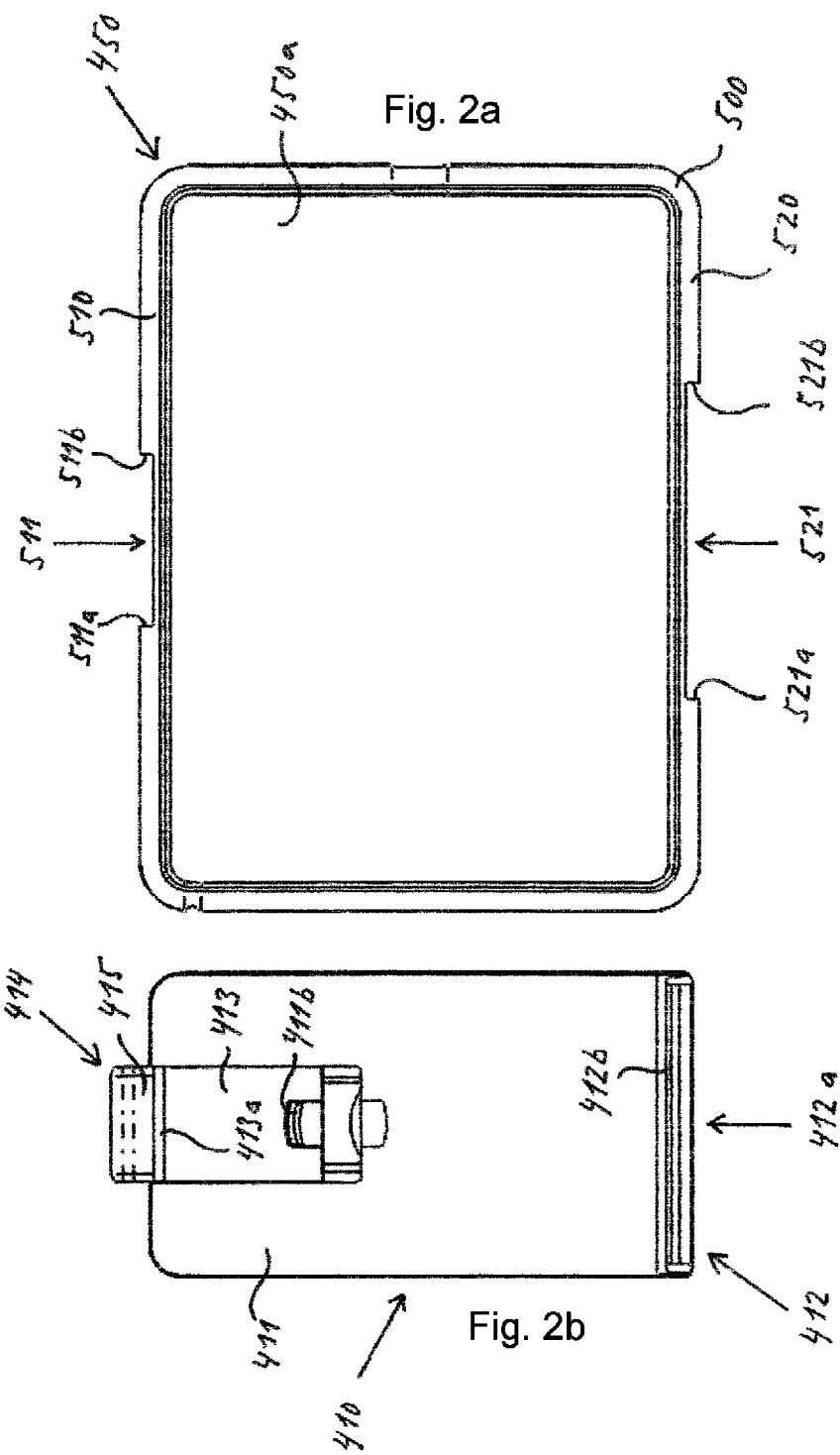

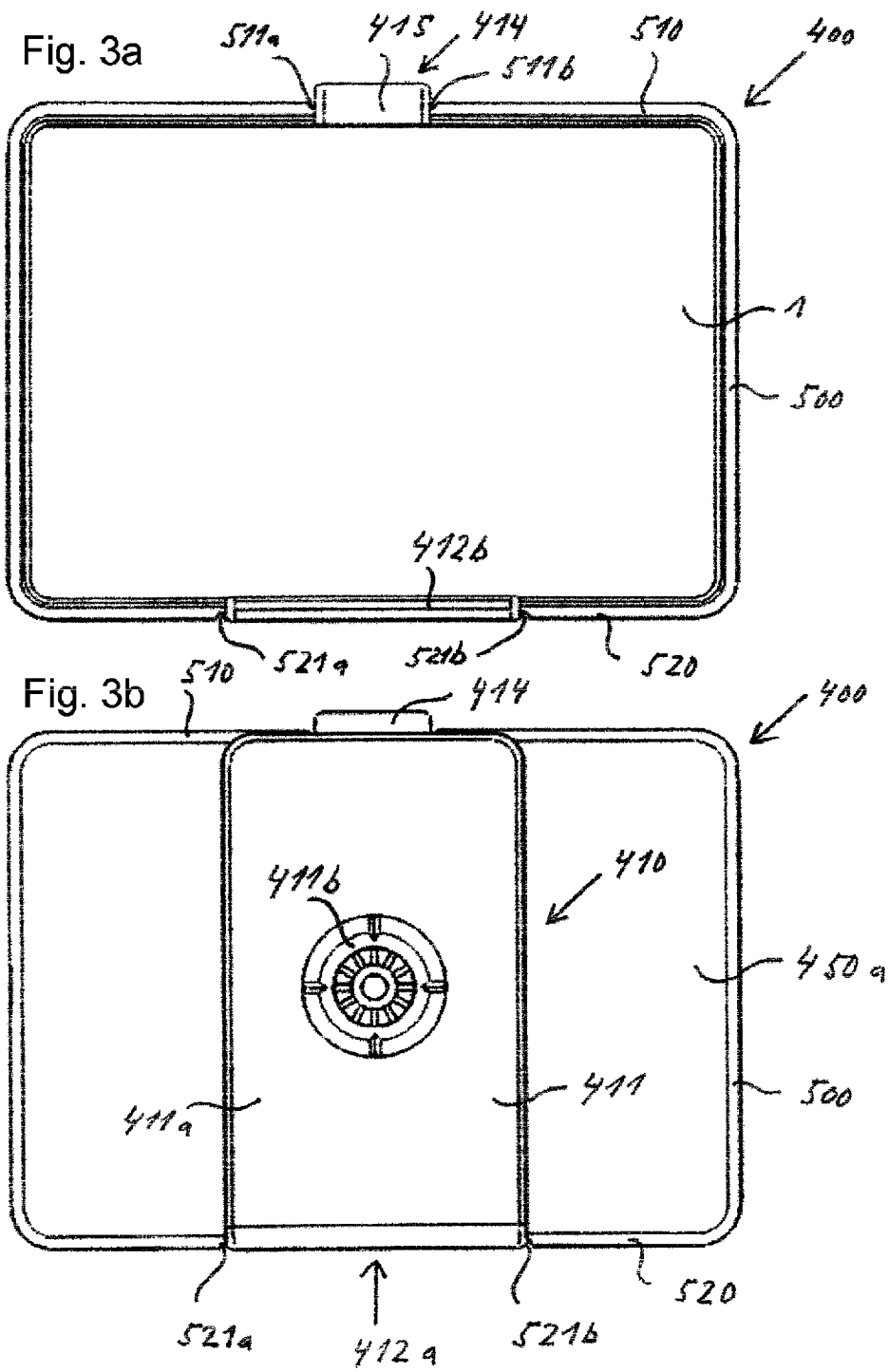

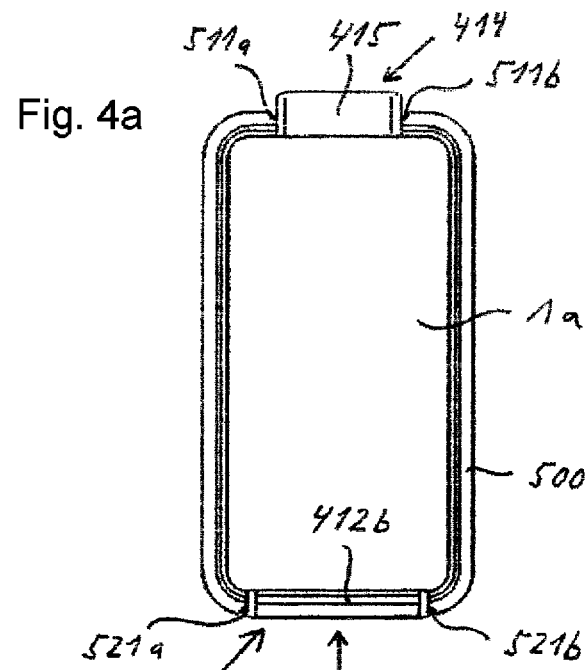
Fig. 4a
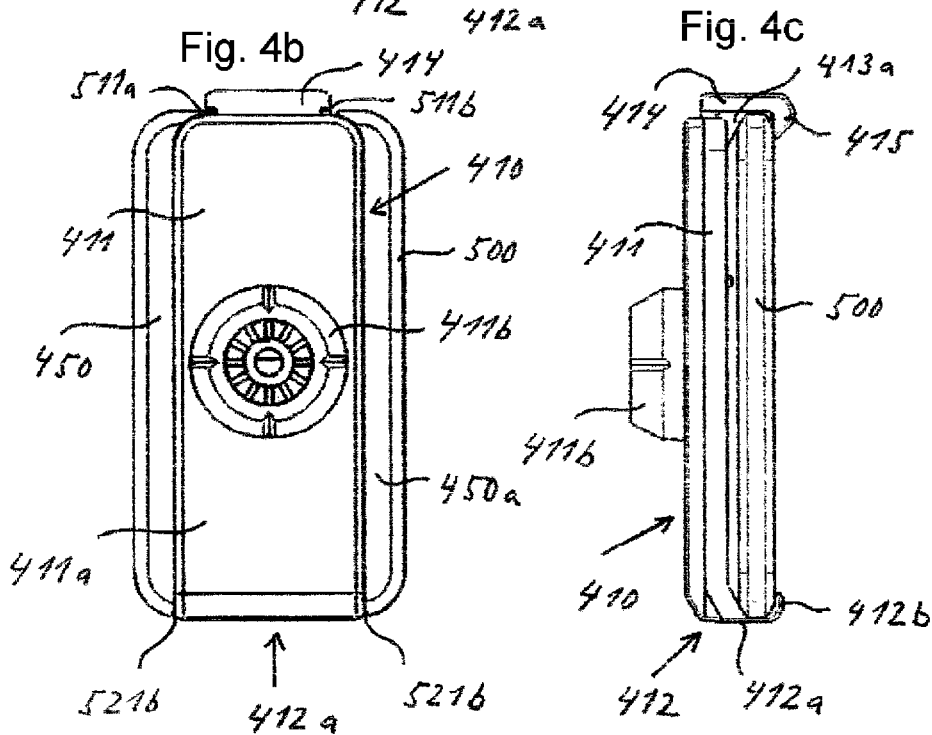
Fig. 4b
Fig. 4c

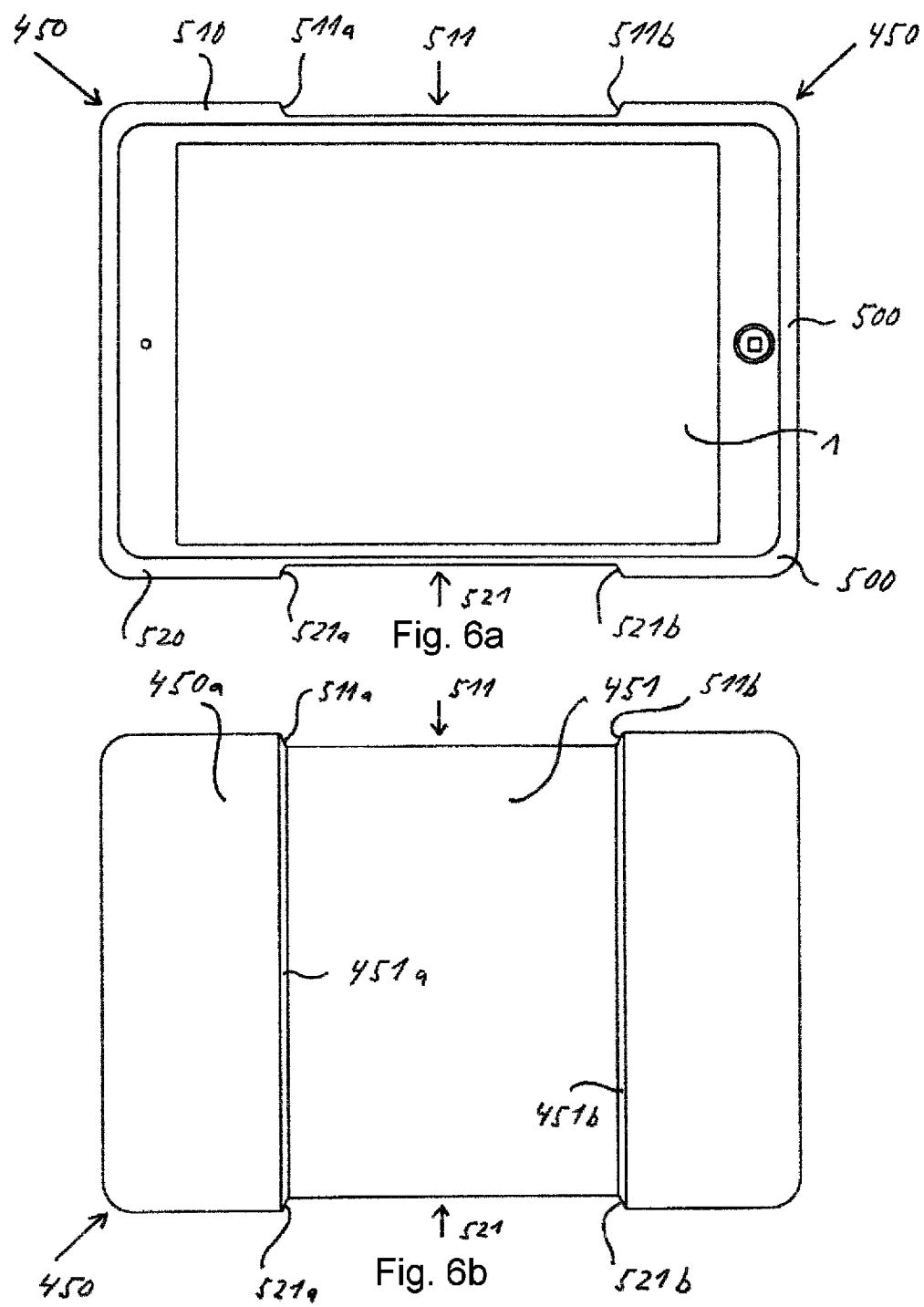

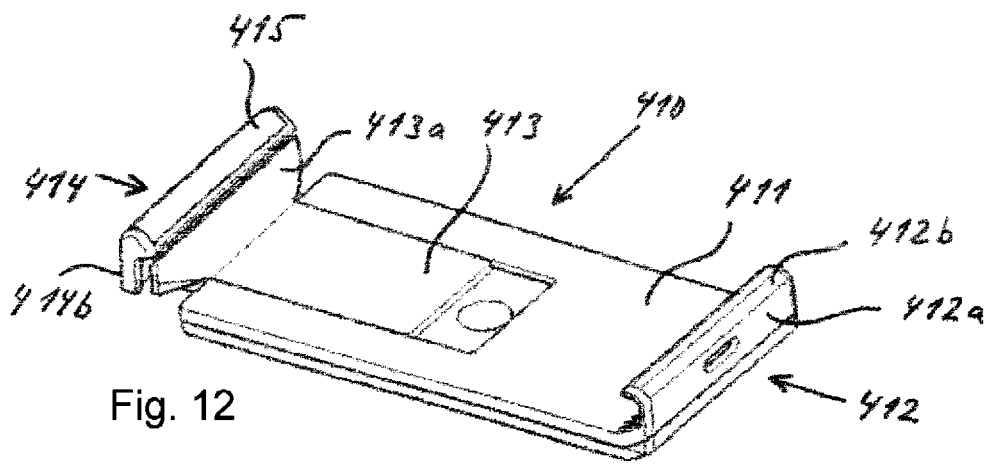
Fig. 12
Fig. 13
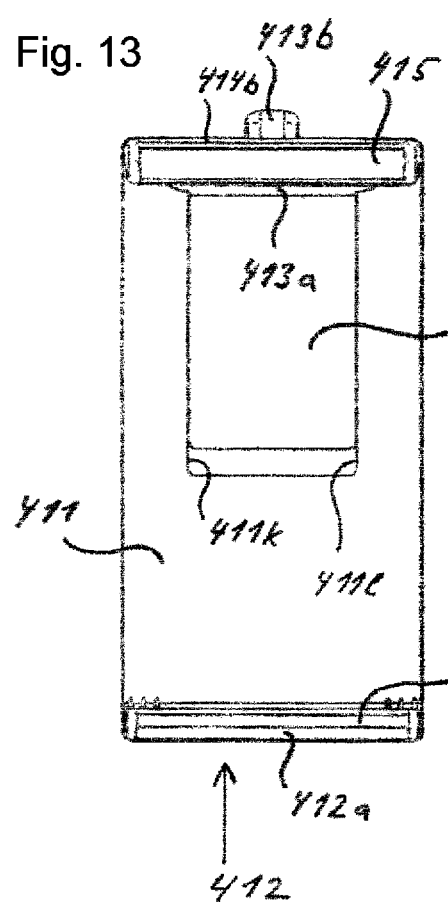
Fig. 14
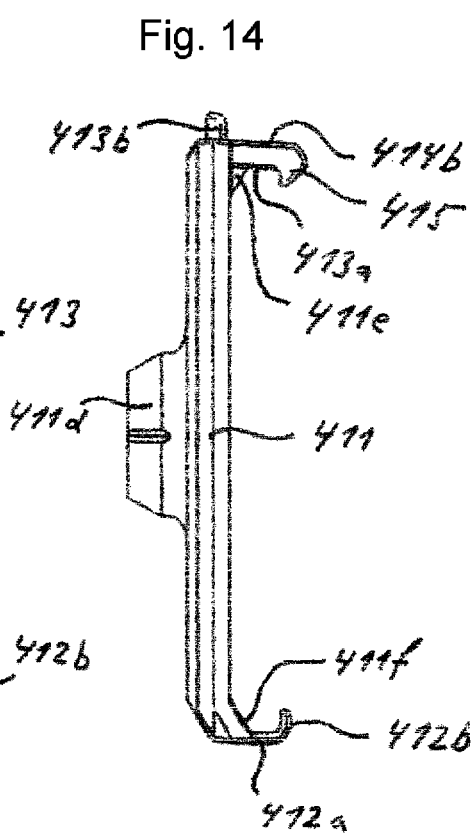

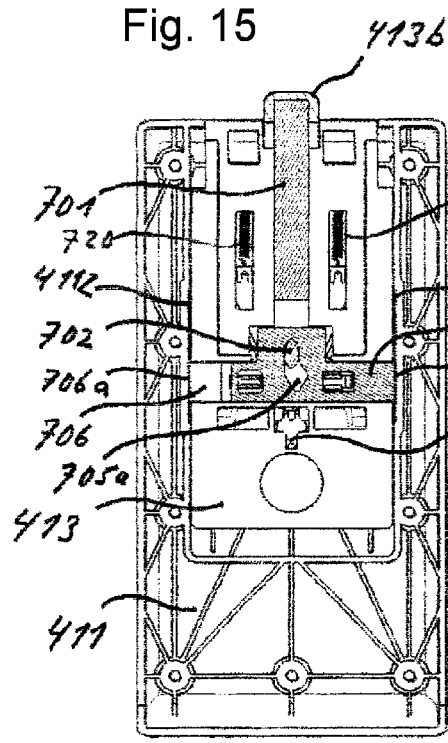
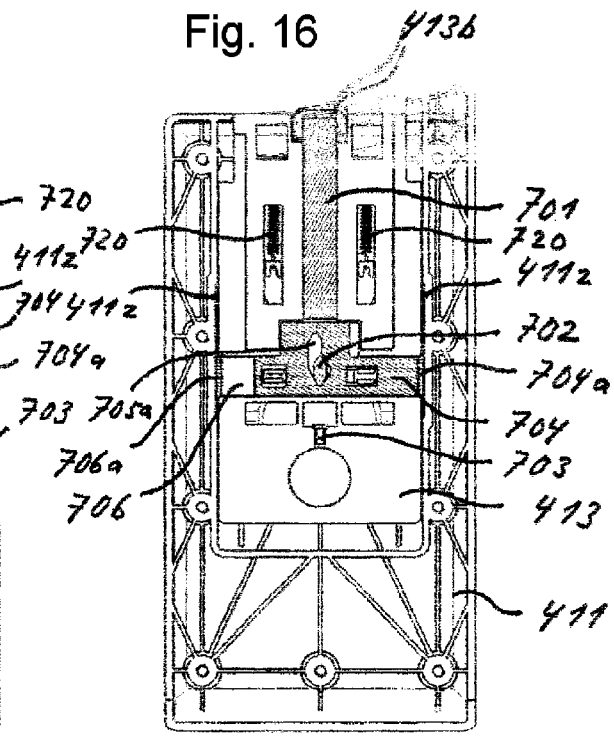
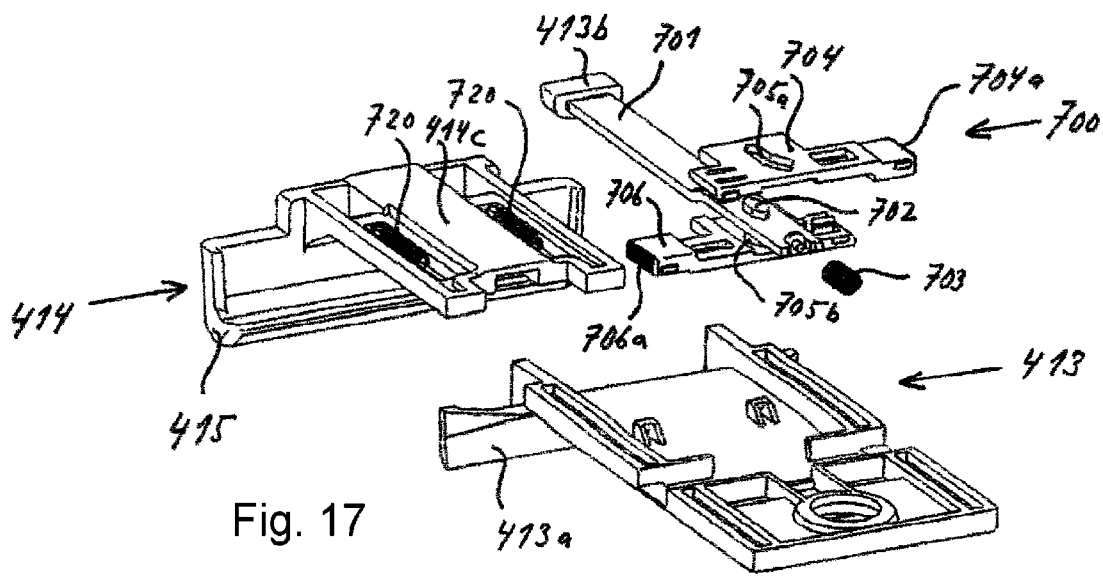
Fig. 15
Fig. 16
Fig. 17

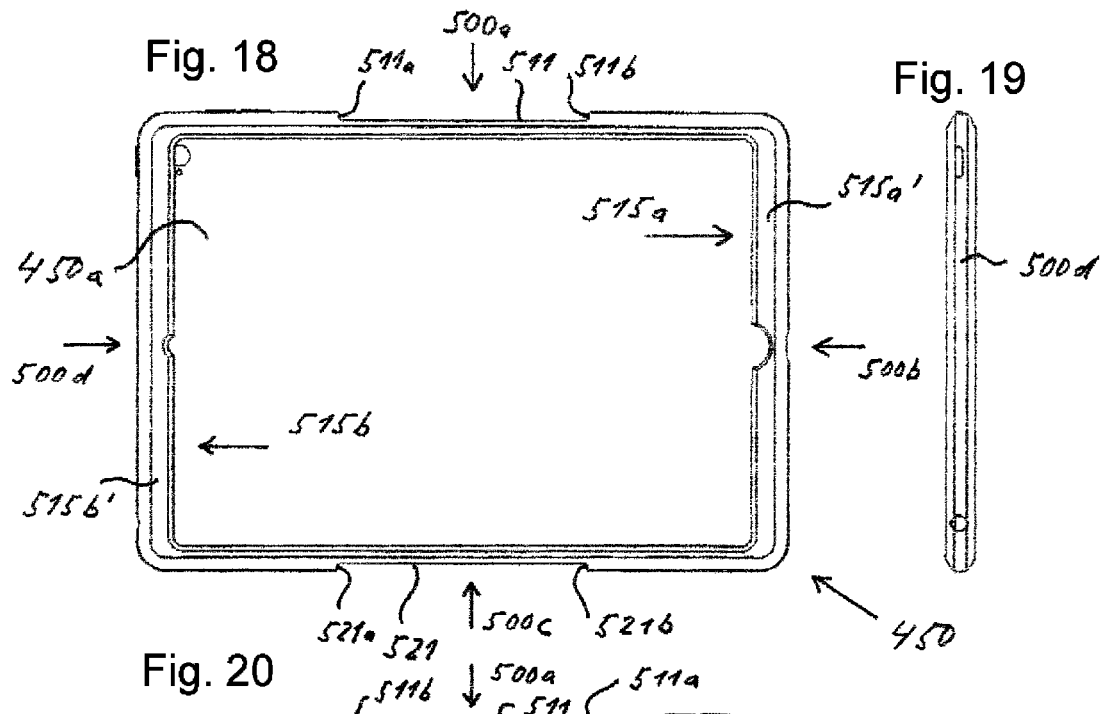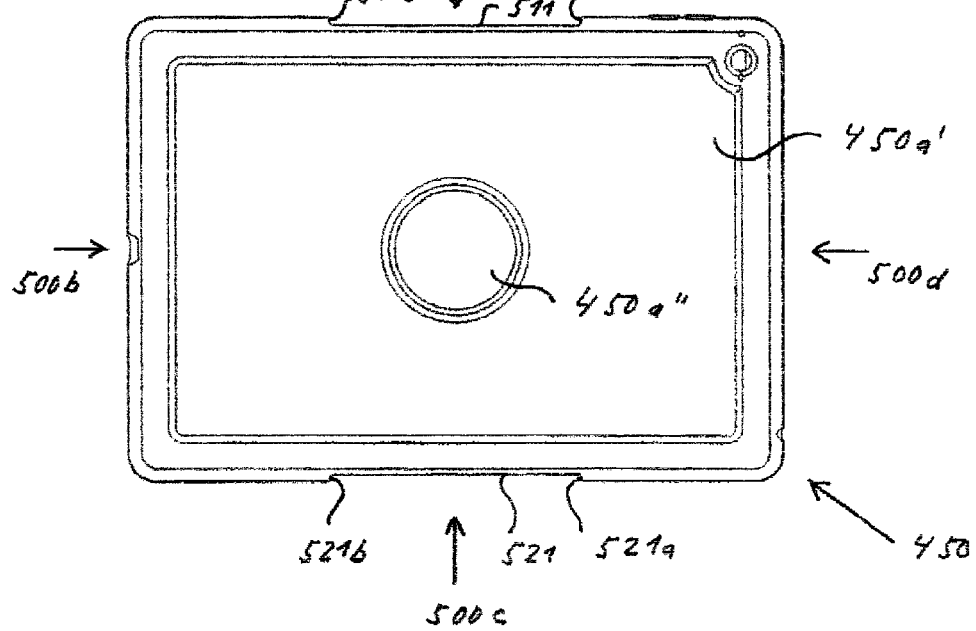

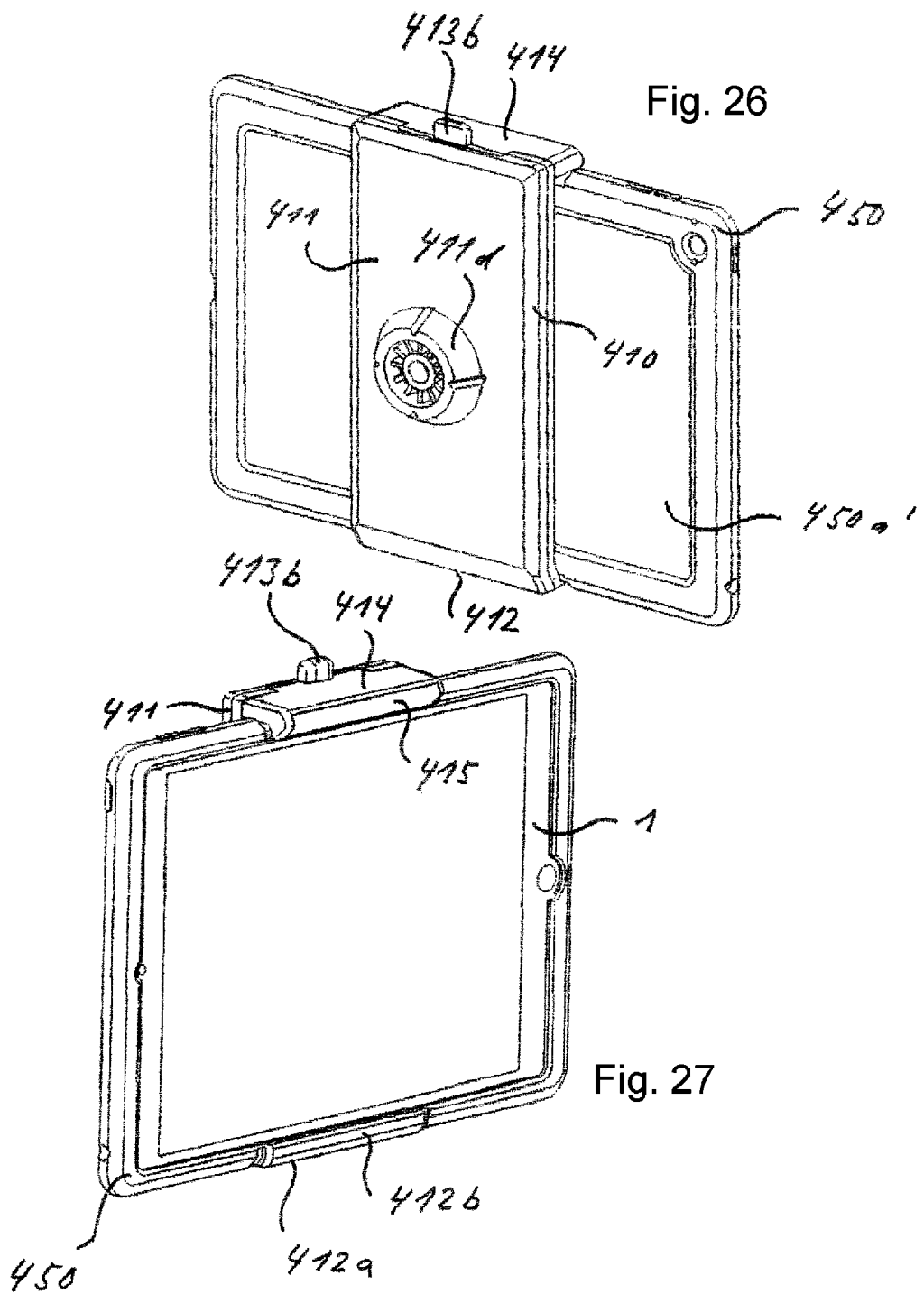

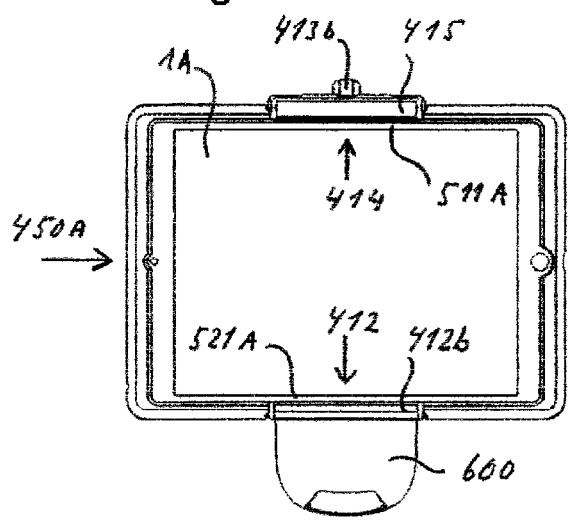
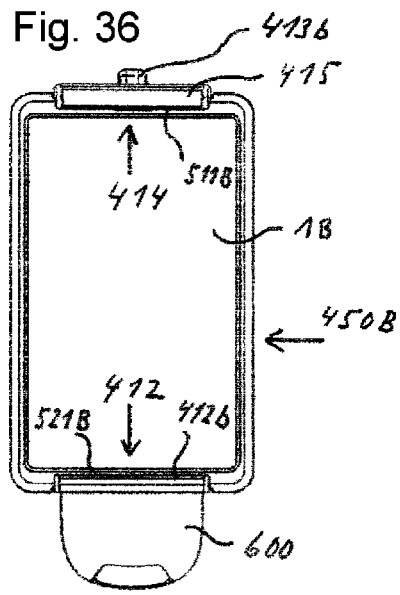
Fig. 35  Fig. 36
Fig. 37  Fig. 38

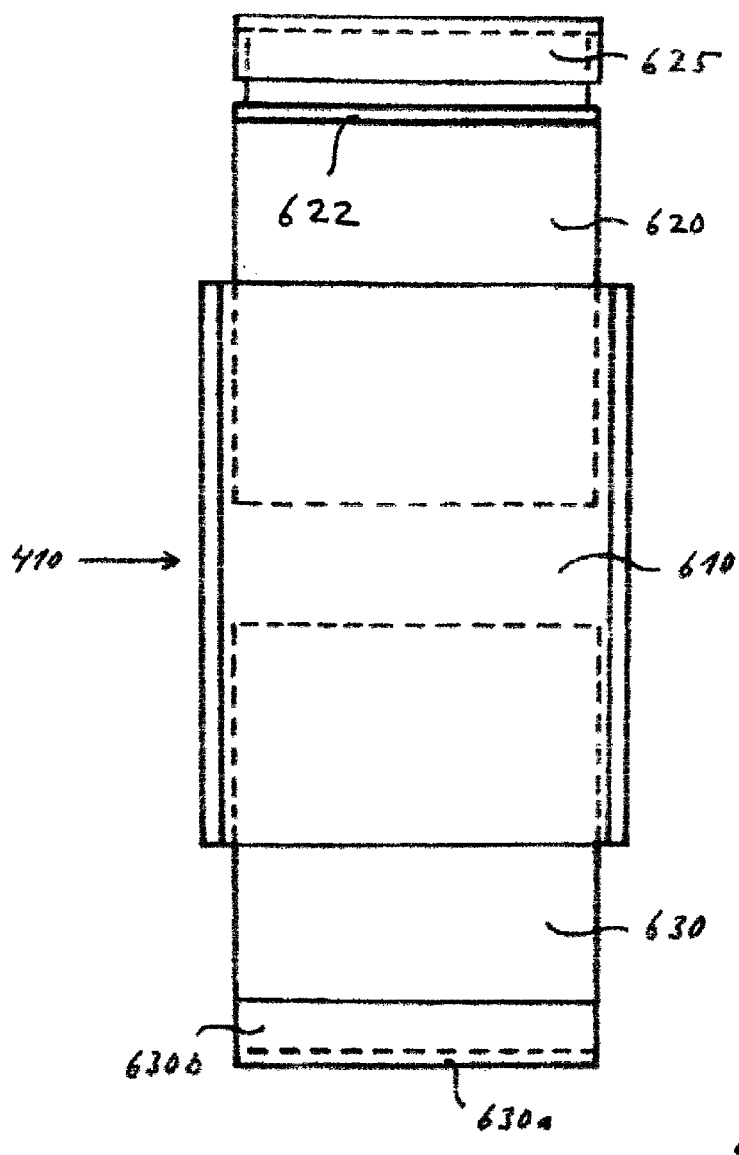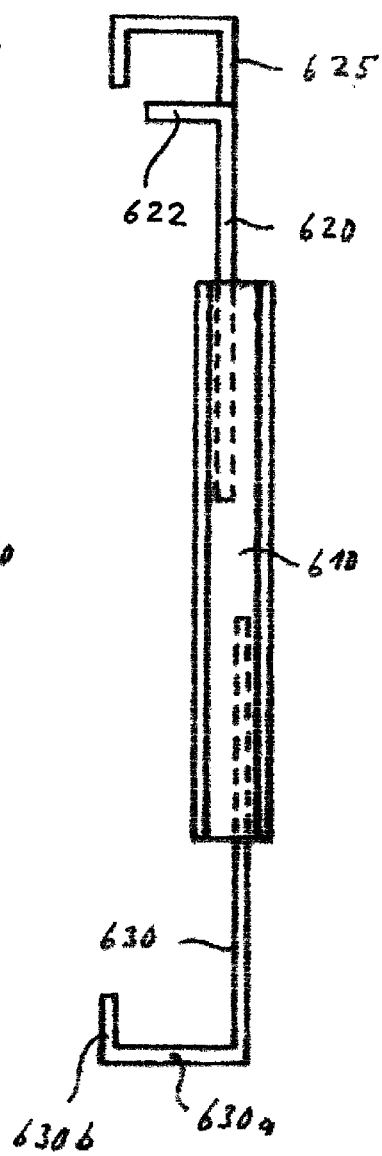

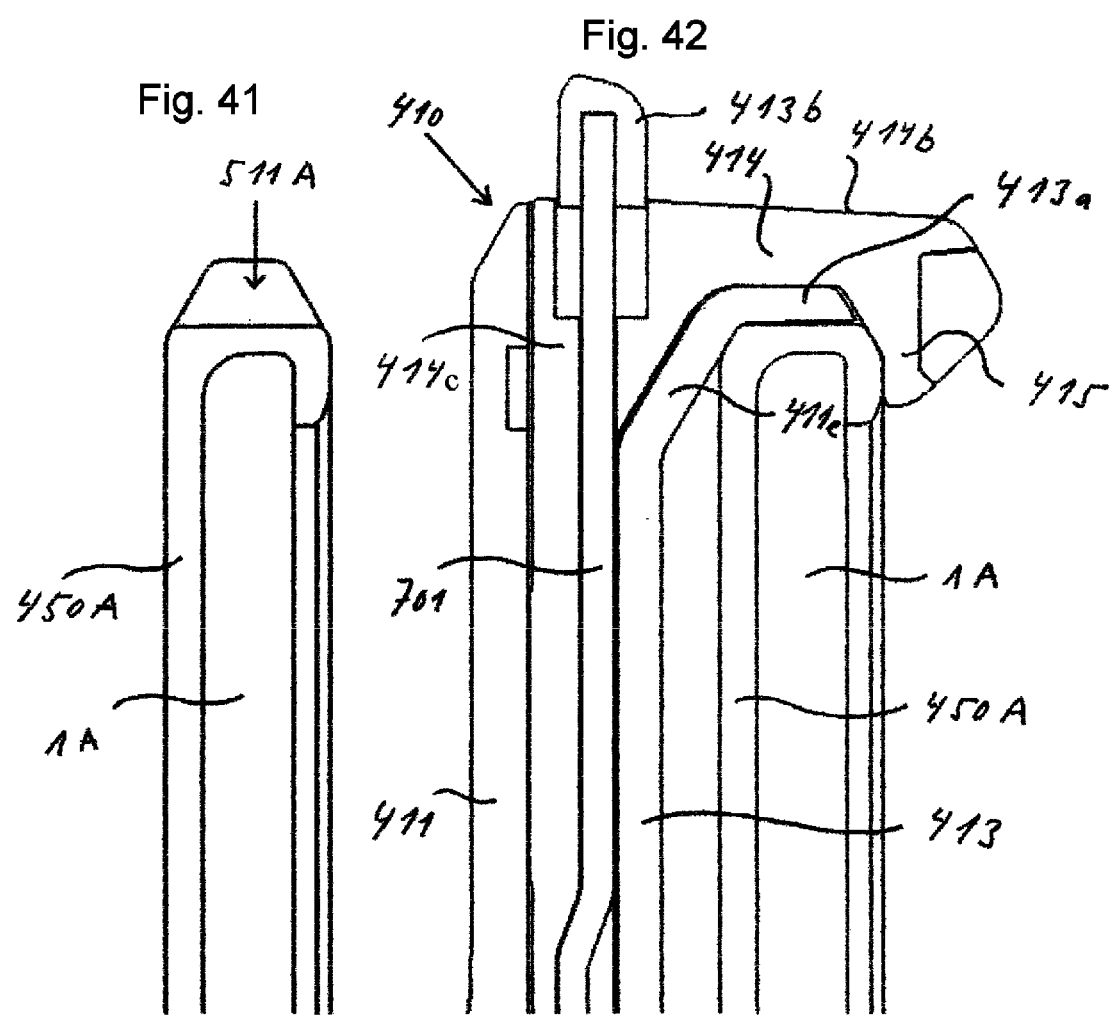

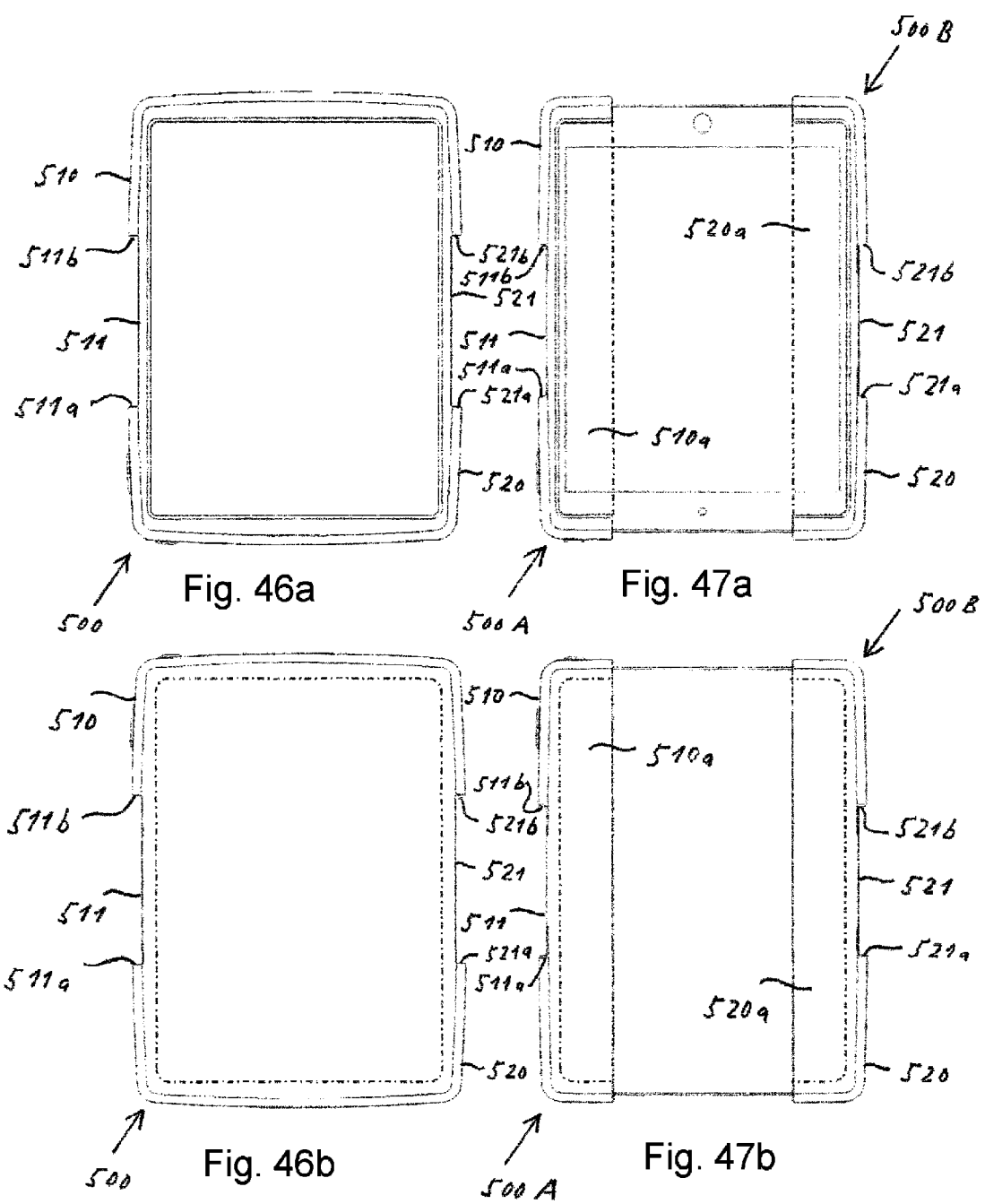

Fig. 54
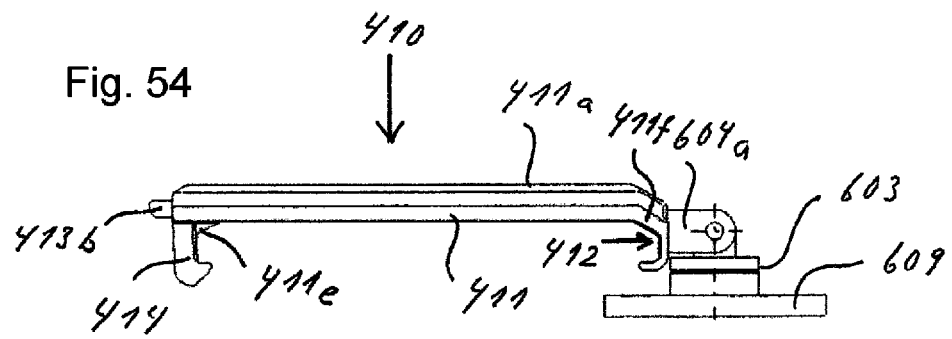
Fig. 55a
Fig. 55b
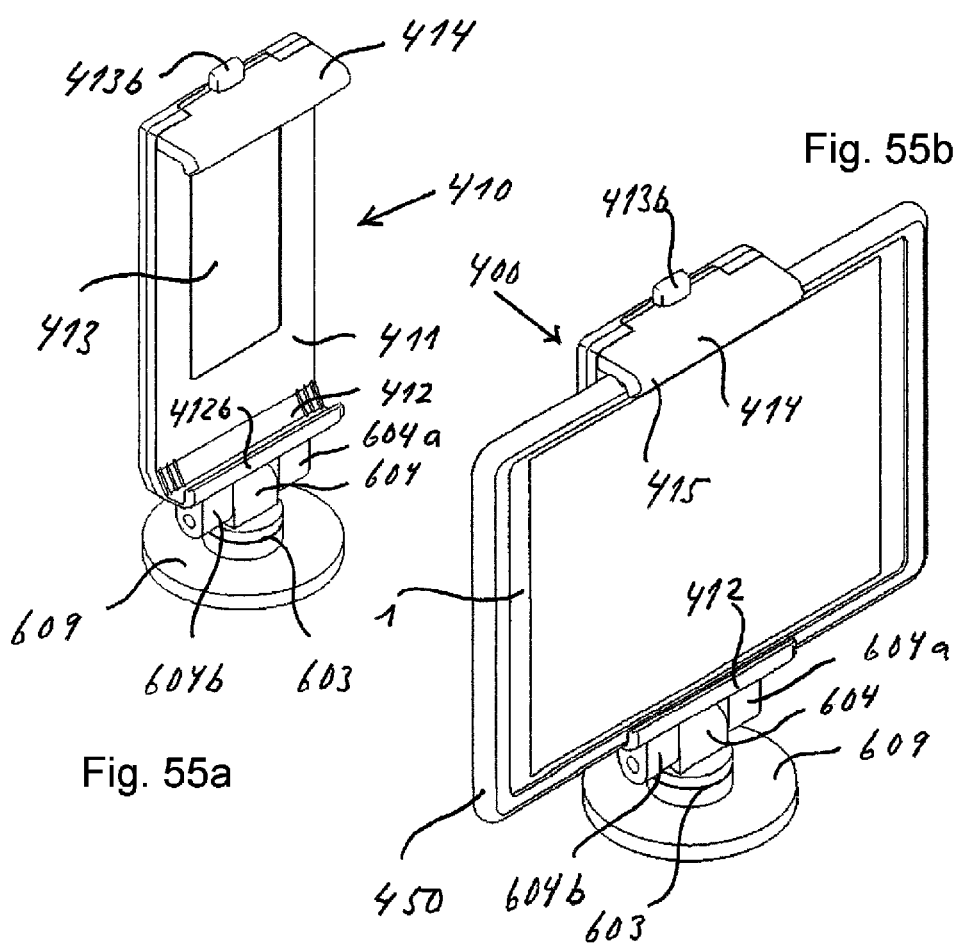

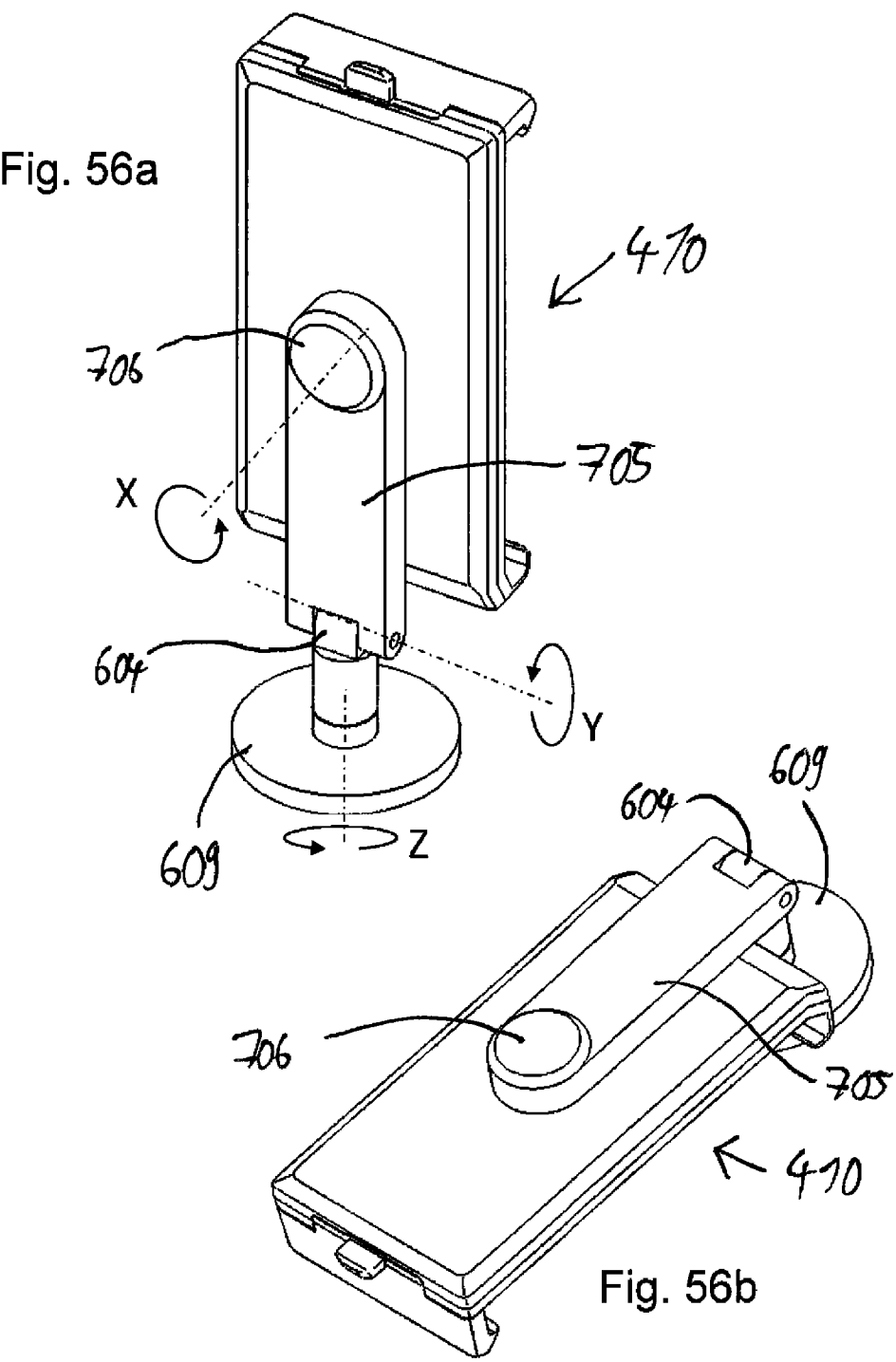

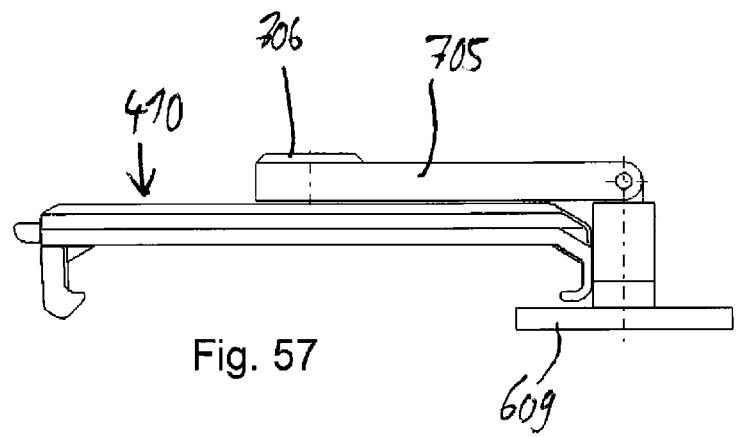
Fig. 57
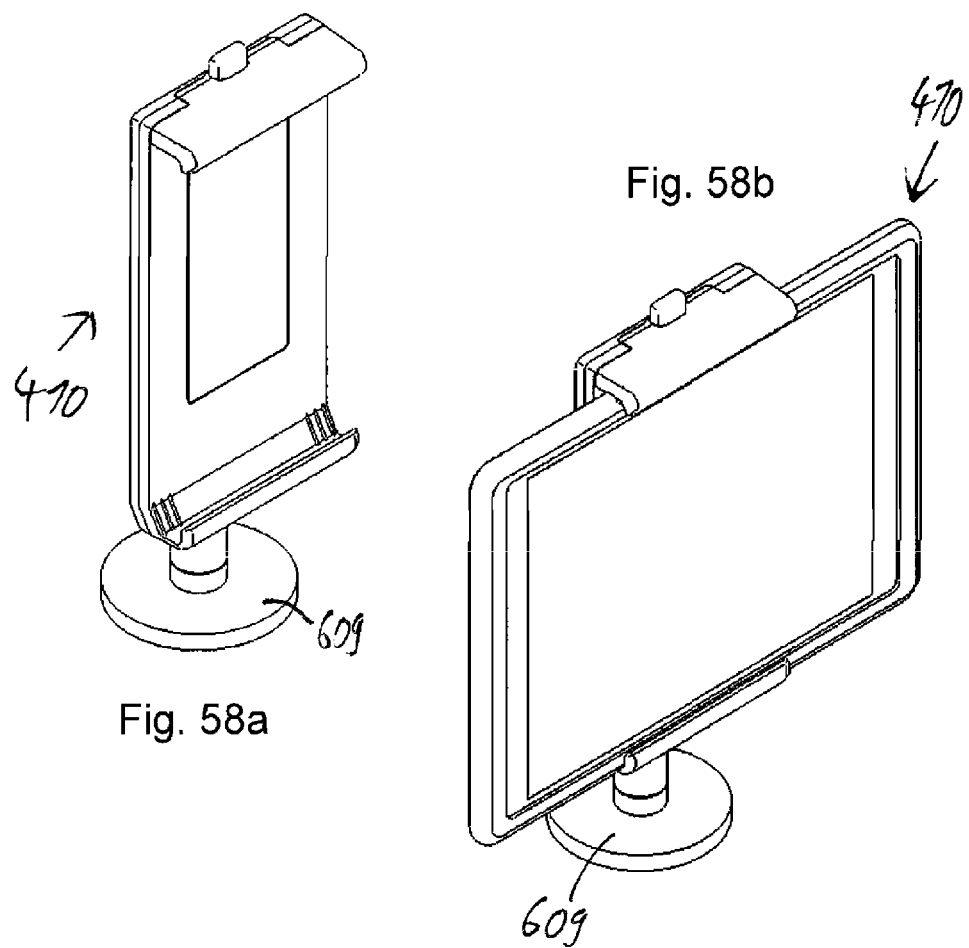
Fig. 58a
Fig. 58b

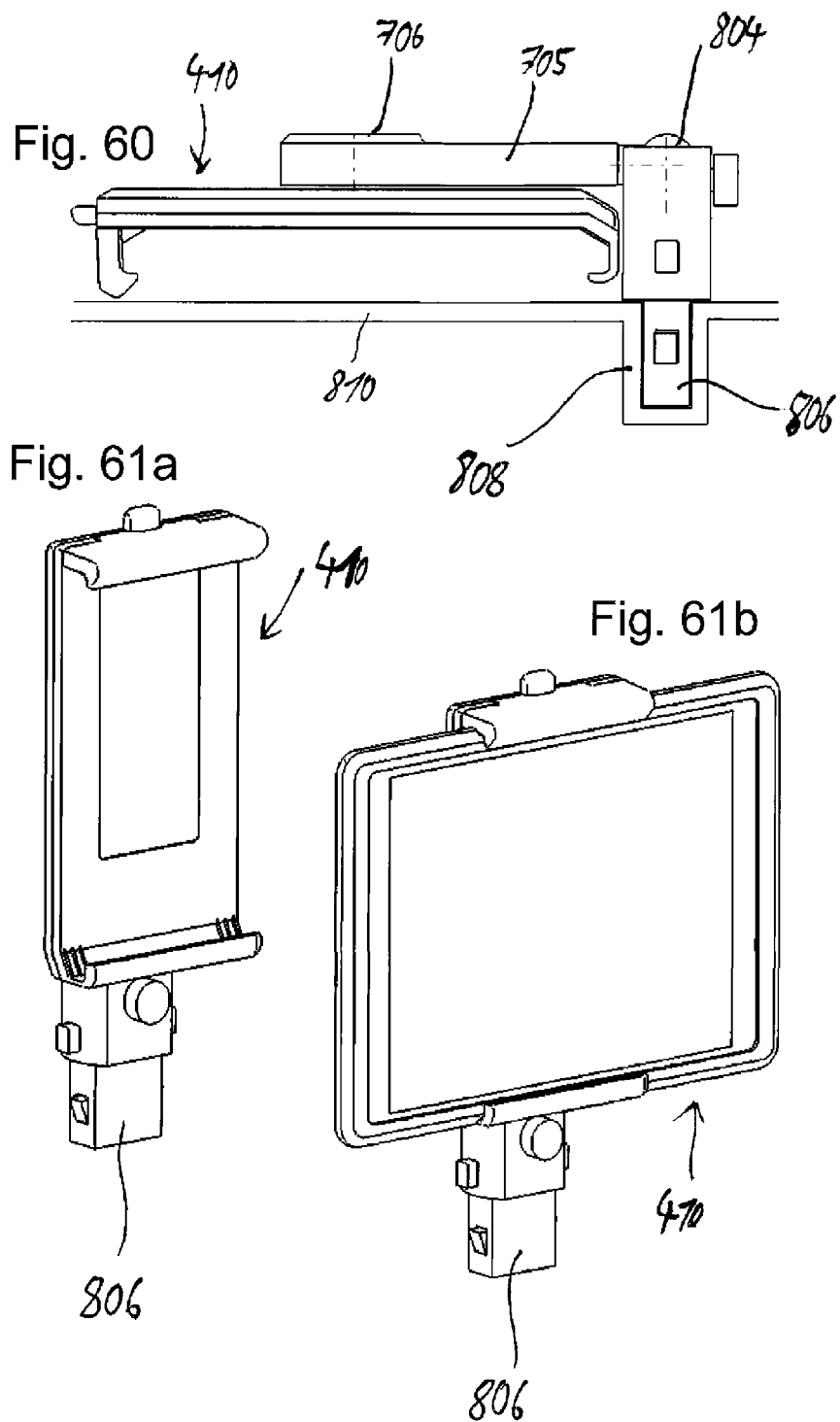

HOLDER FOR FLAT, APPROXIMATELY RECTANGULAR DEVICES, SUCH AS TABLET COMPUTERS OR SMARTPHONES

BACKGROUND OF THE INVENTION

Field of the Invention

The invention relates to a holder for securing flat, approximately rectangular devices having different external dimensions, such as tablet computers or smartphones, to a component, in particular to a component of a motor vehicle.

Description of Related Art

Such holders have been described by the applicant in WO 2014/068146, to which reference is made. In particular, the holders described in FIGS. 78 to 88 of the aforementioned application can be adjusted to different lengths or widths of the devices to be held and comprise an approximately rectangular receiving tray having a bottom wall and four side walls that form a peripheral protective edge as well as a mounting arranged inside of the protective edge having a U-shaped receiving pocket arranged on a longitudinal side of the receiving tray that engages around a longitudinal edge of a device inserted into the mounting and having a spring-loaded holding clip arranged on a displaceably mounted slide having a hold-down element that covers the opposite longitudinal edge of a device inserted into the mounting.

A device inserted between the receiving pocket and holding clip is accordingly held on two opposite longitudinal sides in a clip-like manner in the mounting while the side walls form lateral stops on the narrow sides of the receiving tray such that the device cannot slide sideways out of the mounting.

If the clearance between the side walls is greater than the length of the device inserted into the holder, a space forms that is not aesthetically pleasing, especially if the device is asymmetrically inserted into the holder.

In addition, the device may slide back and forth in the holder during lateral acceleration or even come out of the holder and cause, in addition to unpleasant noises, damage or in extreme cases even injury to passengers in an accident.

In addition, it is necessary to adapt the size of the receiving tray to the largest device to be held such that an unnecessary amount of space is taken up for smaller devices.

A different holder for smartphones is known from US 2013/0318775 A1 that comprises a mounting and a tray for receiving a smartphone. In the central region of its rear side, the tray has a coupling section for securing the tray to the mounting in a bayonet-like manner. The arrangement of a coupling on the rear wall of the tray causes the rear wall to become extremely thick. In addition, the hole-like recess is unsatisfactory both aesthetically and for handling. The point-like attachment of the tray in the center of the rear wall causes the tray to be highly unstable, in particular if soft materials are used. The smartphone is not held by the mounting or the tray, which can lead to dangerous situations if the holder is used in motor vehicles. The tray obscures the view of the coupling, which makes attaching the tray extremely difficult.

SUMMARY OF THE INVENTION

The object of the invention is to create a holder for flat, rectangular devices of various sizes, such as tablet computers or smartphones, with which devices of various sizes can easily and securely be held and which ensures a high level of protection against injuries for passengers in accidents.

This object is achieved according to the invention by a holder for releasably securing a flat, approximately rectangular device, such as a tablet computer or a smartphone, to a component, in particular a component of a motor vehicle the holder comprising a mounting which can be secured to the component and a holder frame which can be releasably secured to the mounting for receiving the device, the mounting comprising a carrier having first connection elements, characterized in that the holder frame has second connection elements at two opposite edges, the first and second connection elements being designed in a complementary manner with respect to each other such that the first connection elements and the second connection elements interlock for the purpose of mutual fixing when the holder frame is inserted into the mounting such that the holder frame cannot be moved out of the mounting in the holder frame plane and/or perpendicularly to the holder frame plane.

Thus, the invention is characterized in that the holder frame has second connection elements on two opposite edges, the first and second connection elements being designed complementary to each other in such a way that the first connection elements and the second connection elements interlock for the purpose of mutual fixing when the holder frame is inserted into the mounting such that the holder frame cannot be moved out of the mounting in the holder frame plane and/or perpendicularly relative to the holder frame plane.

The holder frame is thus securely attached to the mounting. Thanks to the complementary design of the first and second connection elements, the holder frame can reliably be prevented from moving out. The complementary design can be realized by a corresponding geometrical design of the connection elements; however, it is also possible that a complementary design is only obtained when the holder frame is inserted into the mounting. This can be accomplished, for example, by the one connection element deforming, pressing into or digging into the other connection element. In this context, it is possible that a connection element comprises a soft and flexible plastic or foam material that is pressed in by the other connection element for the purpose of complementary interlocking such that the holder frame cannot be moved out of the mounting in the holder frame plane and/or perpendicularly relative to the holder frame plane.

In a preferred embodiment of the invention, the holder comprises a mounting having preferably clip-shaped first connection elements with which a holder frame attached to a tablet computer can be connected in a positive-locking or releasable manner to correspondingly designed second connection elements.

In a further preferred embodiment, the holder frame has a U-shaped profile and is made from a preferably soft material, such as silicone or TPU, and preferably encloses all four front sides of the tablet computer completely, substantially or in sections.

The holder frame can have a two-part design, one second connection element being arranged on each holder frame part.

In a preferred further embodiment, the holder frame is part of a case having a bottom wall that receives the tablet computer as well as side walls that preferably enclose the tablet computer on all sides. Such a case, which can in particular be a protective case, therefore also forms a holder frame within the meaning of the invention.

Furthermore, it is advantageous if the case comprises cover walls on at least two opposite sides, the cover walls at least partially covering and/or overlapping the device in the peripheral area along the sides of the screen.

The case is preferably made as one piece and from an elastic material, such as silicone or TPU, such that the cover walls of the case can be stretched over the edge area on all sides of the monitor side of the tablet computer and the cover can be secured to the tablet computer in a stable manner or the tablet computer can reliably be received by the case.

In a further preferred embodiment, the second connection elements arranged on the holder frame or on the case are formed on the edges of the holder frame or of the case from the frame or of the case, or are arranged on the holder frame or the case as separate parts, preferably made of a hard plastic or metal, or are inserted into, glued onto, integrally molded onto or otherwise connected to the holder frame or case.

The second connection elements arranged on the holder frame or on the case are preferably designed as recesses and/or protrusions on two opposite edges of the holder frame or case.

The second connection elements can in particular form receiving means having lateral stops for the first, preferably clip-shaped, connection elements arranged on the mounting such that the holder frame or case is held with the tablet computer in the mounting in a positive-locking manner and cannot slide sideways out of the mounting.

To prevent lateral shifting, the recesses and/or protrusions of the first and second connection elements can, in a preferred embodiment, be designed as interlocking teeth, it being necessary to provide the number of teeth as well as their size, shape and spacing depending on the requirements for materials, applied force and aesthetics.

The recesses or depressions and/or protrusions or teeth are preferably arranged on the edges, i.e. on the faces and/or in the edge region of the front and/or rear side of the holder frame or case.

In a preferred further embodiment, the first connection elements are clip-shaped and engage around the holder frame or case in frontally arranged recesses on the rear and/or front side of the holder frame or case.

In a further preferred embodiment, the second connection elements can be arranged on the two long edges or on the two short edges of the holder frame or case depending on the format of the tablet computer and the dimensions of the holder frame or case.

In a preferred further embodiment, the second connection elements arranged on two opposite edges of the holder frame or case are arranged approximately centrally with respect to the length of the edges of the holder frame or case and designed in particular symmetrically with identical contours in such a way that tablet computers of various formats can be held centered in the mounting with holder frames or cases having edges of various lengths and in particular inserted into the mounting in positions varying by 180°.

In a further preferred embodiment, the holder frame or case comprises receiving pockets that are arranged on two opposite sides, and preferably on the two narrow sides, and open towards the interior of the case or the towards the inside, the receiving pockets enclosing or engaging around two opposite edges of the device, in particular on all sides.

It is advantageous if the second connection elements are arranged on the two long edges of the holder frame or case and the receiving pockets are arranged on the two short edges of the holder frame or case, or if the receiving pockets are arranged on the two long edges of the holder frame or case and the second connection elements are arranged on the two short edges of the holder frame or case.

It is advantageously provided that the mounting comprises two first connection elements arranged on opposite sides, the spacing thereof being adjustable and thus adaptable to holder frames or cases having various external dimensions. The mounting can therefore be used very flexibly for devices of various sizes.

In a further preferred embodiment, the two receiving pockets and the two in particular clip-shaped connection elements of the mounting jointly form a frame that engages around the tablet computer essentially on all sides and prevents the case from peeling away from the tablet computer, in particular in the corner regions, and the device's edges from being exposed in the event of a head impact in an accident.

In a preferred further embodiment, the edge of the tablet computer is covered outside of the two sections for the second connection elements by a protective edge arranged on the holder frame or on the case.

Furthermore, it is advantageous if the first connection elements are clip-shaped and comprise a first holding clip having a hold-down element and a second holding clip having a hold-down element that engage with the second connection elements and/or engage around the second connection elements. In particular, the hold-down element can prevent the holder frame from being moved out of the mounting perpendicularly with respect to the holder frame plane.

In a preferred further embodiment, the second connection elements on the holder frame or on the edges of the case are reinforced with inserts made of a stable material, such as a hard plastic or metal wire. If a soft material is used for the holder frame or case, the accuracy of fit can be improved for the first connection elements of the mounting, the stability and abrasion resistance, in particular with respect to the moving hold-down element, can be improved and damage to the holder frame or case can be prevented when it is inserted into or removed from the mounting.

In a preferred further embodiment, the holder frame or case is dimensioned in such a way all around in the edge region that it provides effective protection against injuries to passengers in a vehicle caused by the sharp-edged tablet computer as well as against damage to the tablet computer if it falls down onto the ground.

The holder frame or case is preferably as thin as possible and has a flat design without protruding elements such that it is not disturbing even if the tablet computers are used outside of vehicles, and it remains attached to the tablet computer as a protective edge or protective case, making it unnecessary to attach and remove the holder frame or case when the tablet computer is used with or without the mounting.

According to the invention, it can be provided that the first holding clip is arranged securely on the carrier and the second holding clip is arranged on an extendable slide mounted in or on the carrier. In this manner, the distance between the two holding clips can in particular be adjusted and adapted to the size of the device.

The slide can be mounted in an adjustable manner parallel to the longitudinal axis X-X of the carrier and can be secured in different positions with a locking device. The locking device can be releasable with a push button that is accessible on the front wall of the second holding clip.

In a further preferred embodiment, a second movable holding clip, preferably designed as a second slide, can also be arranged on the carrier instead of a fixed holding clip, the two slides preferably being guided on top of one another in the carrier and movable in a synchronous manner and in opposite directions via a gear by means of toothed racks arranged on the two slides according to a known design.

A support wall that forms a fixed stop for the device with holder frame or case can be arranged on the end of the slide facing away from the first holding clip. As a result, the device can be inserted into the mounting in an accurately positioned fashion.

It is also advantageous if the second holding clip is movably mounted in or on the slide parallel to the longitudinal axis X-X and spring biased against the support wall such that the hold-down element of the holding clip extends beyond the support wall and covers the edge of the holder frame or case with the device inserted into the mounting. This makes it possible to ensure that the device is inserted into the mounting or removed from the mounting in a simple, quick and functionally reliable manner. Preferably arranged on the carrier and on the slide are wedge-shaped ramps which lift a device with holder frame or case that is inserted into the mounting when the slide and carrier push against other until the holder frame or the case rests against the two hold-down elements.

The rear wall and the hold-down element of the first holding clip and the support wall and hold-down element of the second holding clip preferably engage around the recesses on the holder frame or on the case with the device.

It is also advantageous if the ramp, the rear wall and the hold-down element on one edge and the ramp, the support wall and the hold-down element on the opposite edge in the area of the recesses engage around the holder frame or case with the device and support it on all sides.

For the purpose of easy installation, it is advantageous if the mounting can be connected to the component via a releasable coupling having a connector element on the mounting and a receiving socket on the component.

The size of the holder is thus largely determined by the size of the device with holder frame or case inserted into the mounting, while the size of the mounting without device is very small and compact.

Further advantages and embodiments of the invention will become apparent in the description and the accompanying drawings.

It goes without saying that the aforementioned features and those still to be explained below can be used not only in the respectively specified combinations, but also in other combinations or singly, without departing from the scope of the present invention.

The described features and embodiments and those still to be explained below are valid for "tablet computers" as well as for "smartphones" or similar devices, even if this is not explicitly stated each time.

BRIEF DESCRIPTION OF THE DRAWINGS

The invention is explained in greater detail below on the basis of preferred exemplary embodiments with reference to the accompanying drawings.

FIG. 2a shows a front top view of the mounting as illustrated in FIG. 1c.

FIG. 2b shows a front top view of a case with tablet computer inserted.

FIG. 3a shows a front top view of a tablet computer with case, as illustrated in FIG. 2b, inserted into a mounting as illustrated in FIG. 2a.

FIG. 3b shows a rear top view of a tablet computer with case, as illustrated in FIG. 2b, inserted into a mounting as illustrated in FIG. 2a.

FIG. 4a shows a front top view of a smartphone with case inserted into a mounting.

FIG. 4b shows a rear top view of a smartphone with case, as illustrated in FIG. 4a, inserted into a mounting.

FIG. 4c shows a side view of a smartphone with case, as illustrated in FIG. 4a, inserted into a mounting.

FIG. 5b shows a rear perspective view of the mounting as illustrated in FIG. 5a.

FIG. 6a shows a front top view of a case having an inserted tablet computer.

FIG. 6b shows a rear top view of the case as illustrated in FIG. 6a.

FIG. 12 shows a perspective view of a further embodiment of a mounting for a tablet computer with case having a carrier and a holding clip securely arranged on the carrier as well as a slide adjustably mounted in the carrier and a holding clip movably mounted in the slide, with the slide in the extended position and the movable holding clip in the open position for inserting and removing a tablet computer with case.

FIG. 13 shows a front view of the mounting from FIG. 12 with the slide in an intermediate position and the holding clip in the closed position.

FIG. 14 shows a side view of the mounting as illustrated in FIG. 13.

FIG. 15 shows a longitudinal cross-section of the mounting of FIGS. 12 to 14 with a further variant of a locking device for the slide in the blocking position.

FIG. 16 shows a longitudinal cross-section of the mounting, as illustrated in FIG. 15, with the locking device of the slide in the release position.

FIG. 17 shows an exploded perspective view of the locking device of FIG. 15 and FIG. 16.

FIG. 18 shows a front view of a further variant of a case for a tablet computer.

FIG. 19 shows a side view of the case from FIG. 18.

FIG. 20 shows a rear view of the case from FIG. 18 and FIG. 19.

FIG. 26 shows a rear perspective view of the holder as illustrated in FIGS. 23 to 25.

FIG. 27 shows a front perspective view of the holder as illustrated in FIG. 26.

FIG. 35 shows a front view of the device with tablet computer and case in landscape position, as illustrated in FIG. 33, inserted into the vertically oriented mounting having a retracted slide, as illustrated in FIG. 31.

FIG. 36 shows a front view of the device with tablet computer and case in portrait position, as illustrated in FIG. 34, inserted into the vertically oriented mounting having an extended slide, as illustrated in FIG. 32.

FIG. 37 shows a front view of a device, as illustrated in FIG. 35, with horizontally oriented mounting and tablet computer with case in portrait position.

FIG. 38 shows a front view of a device, as illustrated in FIG. 36, with horizontally oriented mounting and tablet computer with case in landscape position.

FIG. 39 shows a top view of a further variant of a mounting.

FIG. 40 shows a side view of the mounting as illustrated in FIG. 39.

FIG. 41 shows a cross-section of a detailed view of the case with a tablet computer as illustrated in FIG. 33.

FIG. 42 shows a cross-section of a detailed view of the case with tablet computer inserted into the mounting as illustrated in FIG. 35.

FIG. 46a shows a front top view of a one-piece holder frame.

FIG. 46b shows a rear top view of the holder frame as illustrated in FIG. 46a.

FIG. 47a shows a front top view of a two-piece holder frame placed on a tablet computer.

FIG. 47b shows a rear top view of the holder frame as illustrated in FIG. 47a.

FIG. 48 shows a cross-section of the holder frame as illustrated in FIG. 46a.

FIG. 49 shows a cross-section of the holder frame as illustrated in FIG. 47a.

FIG. 54 shows a side view of the holder according to FIG. 53b.

FIG. 55a shows a further perspective view of the holder according to FIG. 53a.

FIG. 55b shows the holder according to FIG. 55a with a tablet computer with case arranged thereon.

FIG. 56a shows a perspective view of a further embodiment of a holder in the use position.

FIG. 56b shows the holder according to FIG. 56a in the non-use position.

FIG. 57 shows a side view of the holder according to FIG. 56b.

FIG. 58a shows a further perspective view of the holder according to FIG. 56a.

FIG. 58b shows the holder according to FIG. 56a with a tablet computer with case arranged thereon.

FIG. 60 shows a side view of the holder in the non-use position secured to a receiving socket.

FIG. 61a shows a further perspective view of the holder according to FIG. 59a.

FIG. 61b shows the holder according to FIG. 59a with a tablet computer with case arranged thereon.

DETAILED DESCRIPTION OF THE DRAWINGS

Figure 1A:
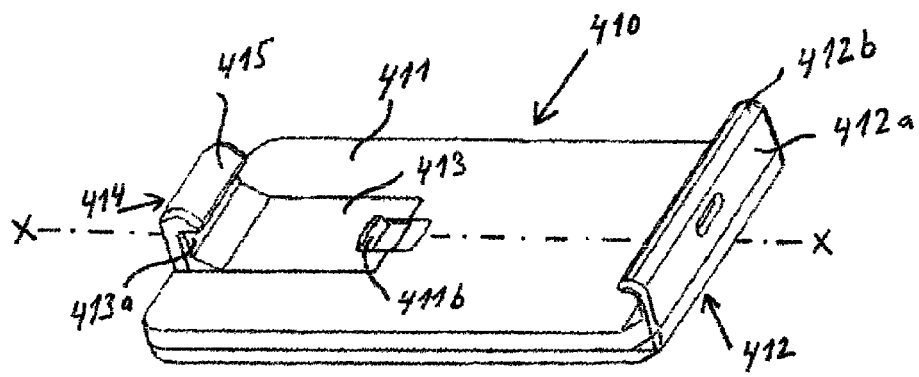
FIG. 1a shows a perspective view of a first embodiment of a mounting for a tablet computer with case, the mounting having a carrier and a holding clip securely arranged on the carrier as well as a slide adjustably mounted in the carrier and a holding clip movably mounted in the slide, with the slide and the movable holding clip in the retracted positions.
Figure 1B:
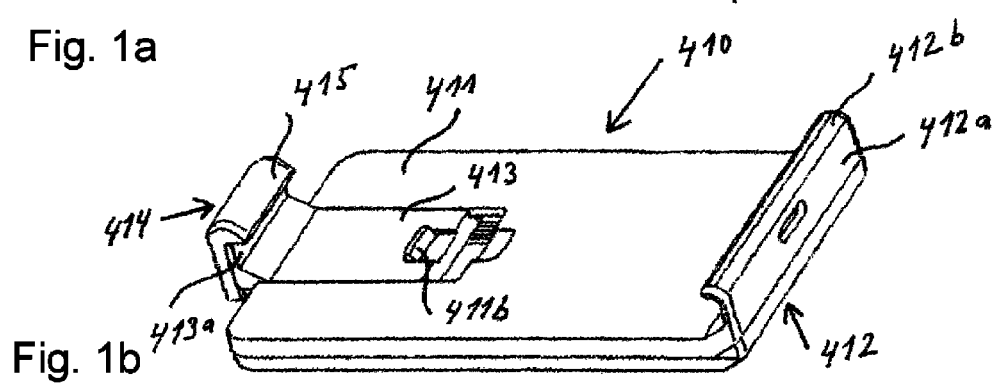
FIG. 1b shows a perspective view of the mounting, as illustrated in FIG. 1a, with the slide in an extended intermediate position.
Figure 1C:
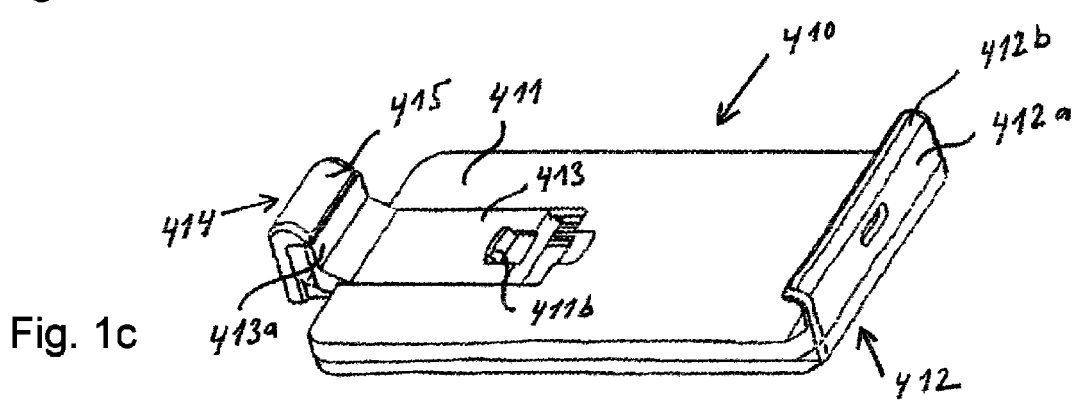
FIG. 1c shows a perspective view of the mounting, as illustrated in FIG. 1b, with the movable holding clip in the open position for inserting or removing a tablet computer with case.

FIGS. 1a to 3b show a first embodiment of the invention comprising a holder 400 having a mounting 410 for a tablet computer 1 provided with a holder frame 500 or case 450, the mounting having a carrier 411 and a holding clip 412, 412a having a hold-down element 412b, which engages around an edge of the holder frame 500 or case 450 of the tablet computer 1, securely arranged on the carrier 411, as well as a slide 413 mounted in the carrier 411 in an adjustable manner parallel to the longitudinal axis X-X and securable in different positions having a fixed stop in the form of the support wall 413a for the opposite edge of the holder frame 500 or case 450 of the tablet computer 1.

Arranged in the slide 413 is a movable holding clip 414 having a hold-down element 415. The holding clip 414 can be displaced in a linear manner parallel to the longitudinal axis X-X, is spring biased against the fixed stop 413a on the slide 413 and engages around the opposite edge of the holder frame 500 or case 450 of the tablet computer 1 inserted into the mounting 410.

The design and operating principle of the mounting 410 correspond to the description of the aforementioned WO 2014/068146 (in particular FIG. 78 to FIG. 88), to which reference is made.

For the purpose of releasably securing the tablet computer 1 in the mounting 410, a holder frame 500 or case 450, preferably made from an elastic material, having an integrated holder frame 500 is provided that encloses the bottom wall and/or the lateral edges of the tablet computer 1.

In the middle of two opposite edges 510, 520 of the holder frame 500 or case 450, recesses 511, 521 are provided with which the rear wall 412a of the holding clip 412 as well as the support wall 413a on the slide 413 and the side walls 414a', 414a" of the holding clip 414 engage.

The hold-down element 412b of the holding clip 412 and the hold-down element 415 of the holding clip 414 engage around the lateral edges and cover the edge of the holder frame 500 or case 450 of the tablet computer 1 such that the tablet computer 1 cannot fall up out of the mounting 410.

The lateral end walls 511a, 511b of the recess 511 and the lateral end walls 521a, 521b of the recess 521 on the holder frame 500 or case 450 form lateral stops for the rear wall 412a of the holding clip 412 as well as for the support wall 413a on the slide 413 or the side walls 414a', 414 a" of the holding clip 414 such that the tablet computer 1 is held in the mounting 410 in a positive-locking manner and cannot slide sideways out of the mounting 410.

The recesses 511 and 521 on the holder frame 500 or case 450 are arranged centrally such that the tablet computer 1 is centered in the mounting 410.

A cone 411d of a pivot bearing, to which the mounting 410 is connected by means of an attachment device (not shown) such that it can be rotated between portrait and landscape mode, is arranged on the rear wall 411a of the carrier 411.

FIGS. 4a to 4c show a mounting 410 and a case 450 having an integrated holder frame 500 that is correspondingly smaller for the purpose of receiving a smartphone 1a but has a design identical to the exemplary embodiments described in 1a to 3b, the two recesses 511, 511a, 511b and 521, 521a, 521b for the holding clips 414, 412 being arranged on the two short edges of the holder frame 500.

For the sake of clarity, components having identical functions are provided with the same references numbers as in 1a to 3b, even if they have different designs.

FIGS. 5a to 8 show a further embodiment of a mounting 410 for a tablet computer (FIGS. 5a-7) and for a smartphone (FIG. 8) also having an identical design as the exemplary embodiments described in FIGS. 1a to 3b.

For the purpose of better understanding, components having identical functions are in this case also provided with the same references numbers as in FIGS. 1a to 3b, even if they have different designs.

Figure 5A:
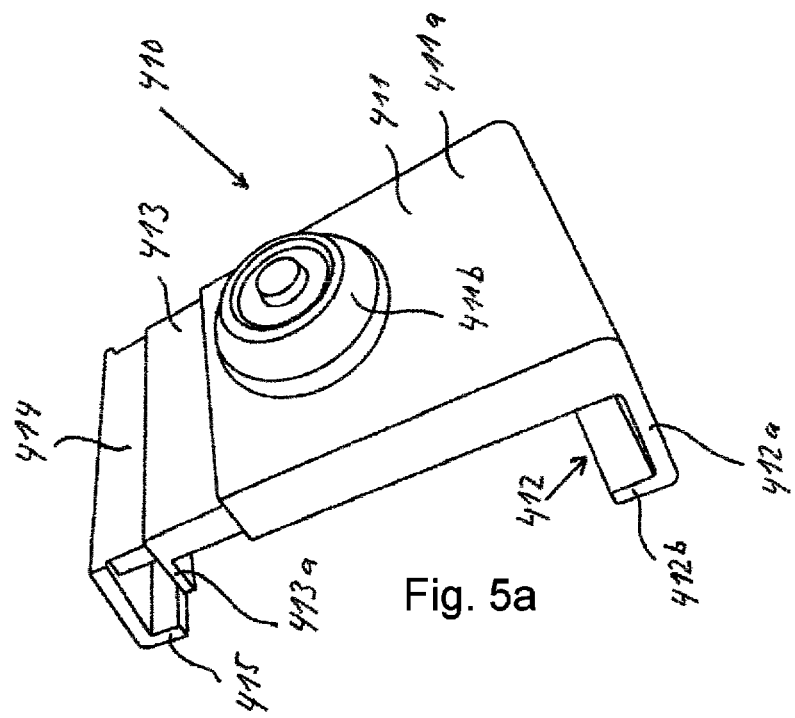
FIG. 5a shows a front perspective view of a further embodiment of a mounting for a tablet computer with case, having a carrier and a holding clip securely arranged on the carrier as well as a slide adjustably mounted in the carrier and a holding clip movably mounted in the slide, with the slide and the movable holding clip in extended positions.
Figure 5B:
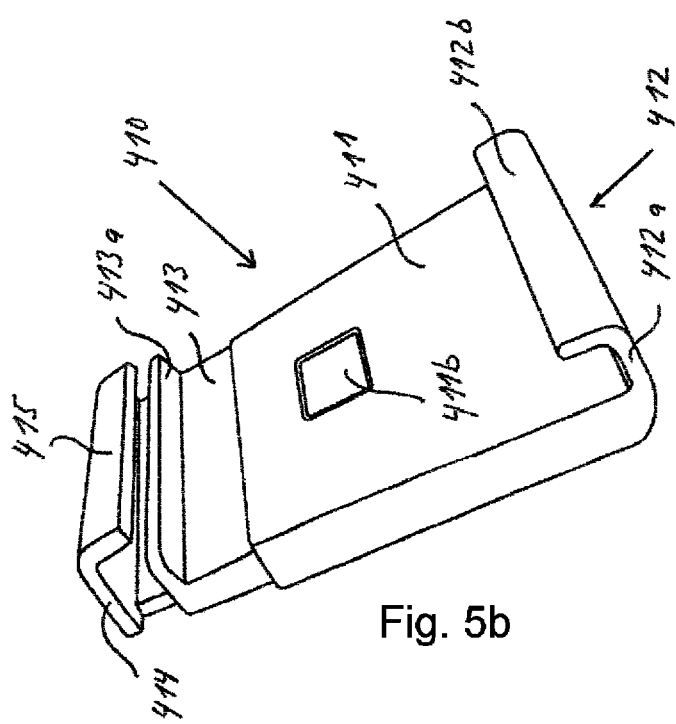
Figure 8:
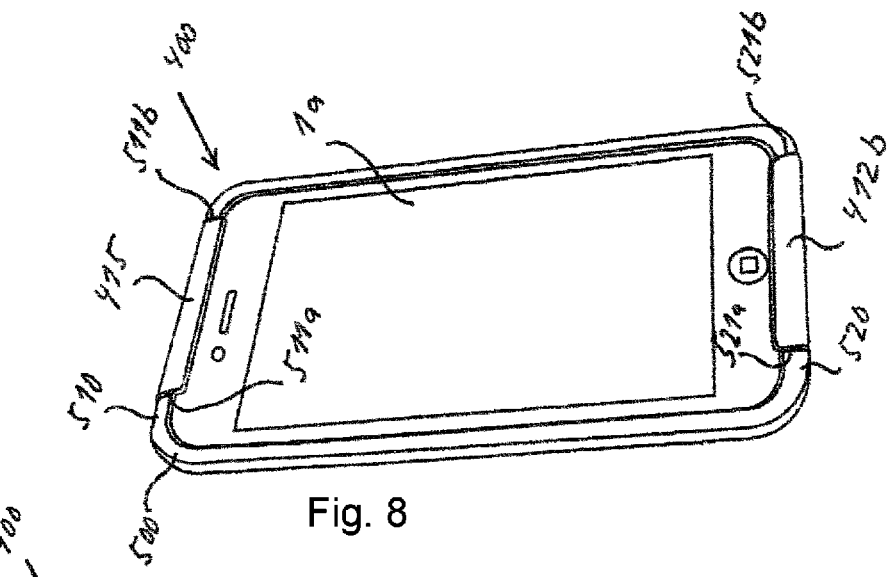
FIG. 8 shows a perspective view of a smartphone having a correspondingly smaller case according to the design of FIGS. 6a, 6b, inserted into a correspondingly smaller mounting according to the design of FIGS. 5a, 5b.
Figure 7:
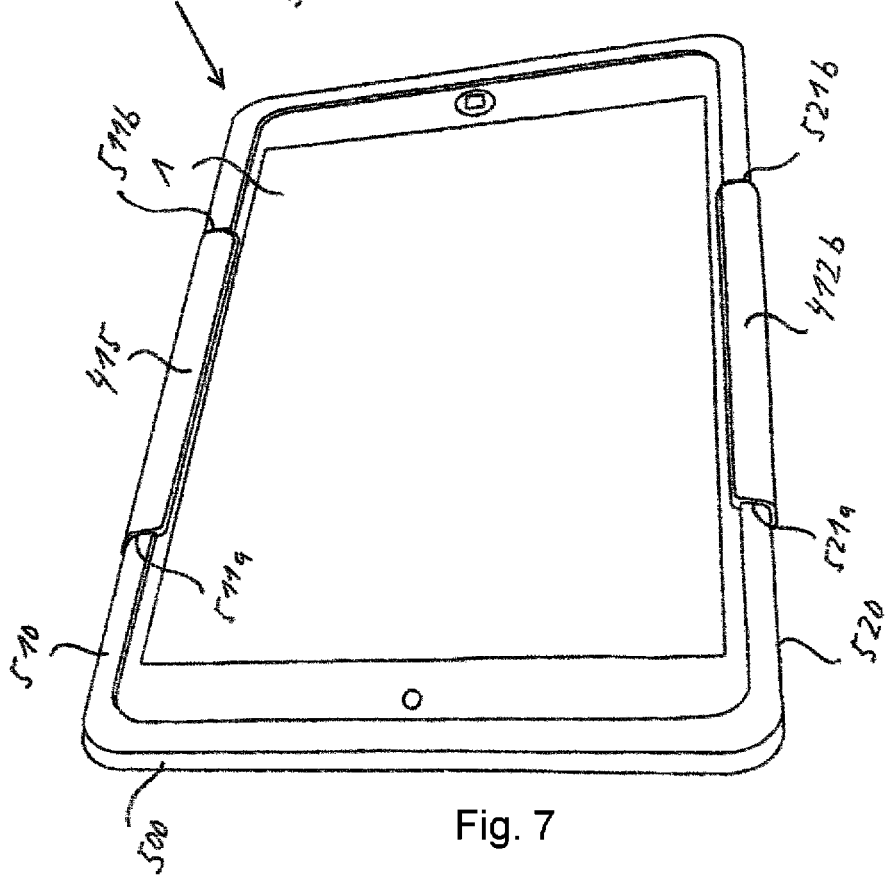
FIG. 7 shows a perspective view of the tablet computer with case shown in FIGS. 6a, 6b that is inserted into the mounting shown in FIGS. 5a, 5b.
Figure 9:
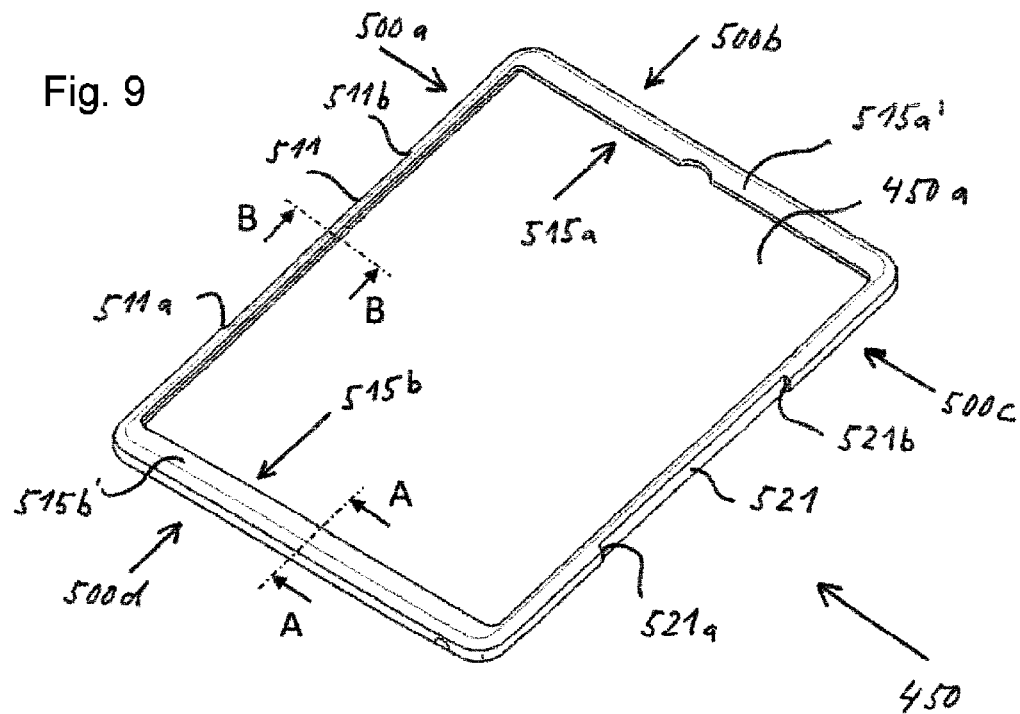
FIG. 9 shows a perspective view of a further embodiment of a case.

The holding clips 412 securely arranged on the carrier 411 as well as the slide 413 having the support wall 413a guided in the carrier 411 and the holding clip 414 movably guided in the slide 413 having the hold-down element 415 have about the same width (FIG. 5a and FIG. 5b).

Accordingly, the recesses 511, 521 arranged on the opposite edges 510, 520 of the holder frame 500 have the same width such that the tablet computer 1 can be inserted into the mounting 410 along with the case 450 in positions varying by 180° degrees.

A centrally arranged recess 451 for receiving the carrier 411 is provided on the external side of the bottom wall 450a of the case 450. The lateral edges 451a, 451b of the recess 451 form additional stops so that the case 450 cannot slip sideways out of the mounting 410.

The release button 411b arranged on the inside of the carrier 411 is used to release the lock of the slide 413 in the carrier 411 such that the slide 413 can slide within the carrier 411.

FIGS. 9 to 11b show a further embodiment of a one-piece case 450 having a bottom wall 450a, two long side walls 500a, 500c, two short side walls 500b, 500d as well as cover walls 515a', 515b' arranged on the short side walls 500b, 500d.

Figure 10A:
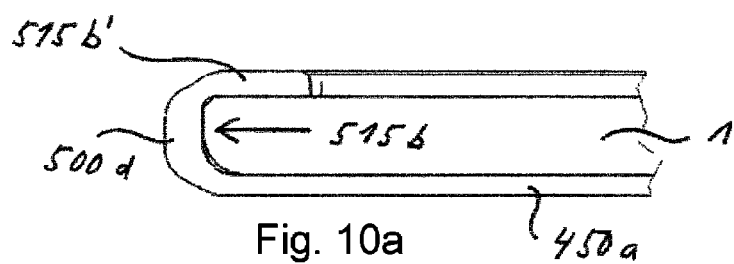
FIG. 10a shows a sectional view A-A as illustrated in FIG. 9.
Figure 10B:
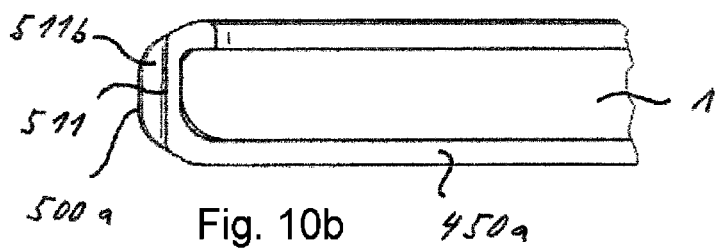
FIG. 10b shows a sectional view B-B as illustrated in FIG. 9.

The short side walls 500b, 500d and the cover walls 515a', 515b' form, together with the ends of the long side walls 500a, 500c and the ends of the bottom wall 450a, receiving pockets 515a, 515b open towards the interior of the case 450 that enclose the housing sections 1', 1" (FIG. 6a) arranged to the side of the screen of the tablet computer 1 on all sides (FIG. 10a).

The recesses 511, 511a, 511b and 521, 521a, 521b (FIG. 10b), with which the clip-shaped connection elements 412, 412a, 412b, 413a, 414, 414a', 414a", 415 (FIG. 1a, 5a, 5b) of the mounting 410 engage, are arranged in the middle of the long side walls 500a, 500c of the case 450.

The clip-shaped connection elements 412, 412a, 412b, 413a, 414, 414a', 414a", 415 of the mounting 450 in the two recesses 511, 511a, 511b and 521, 521a, 521b in the long side walls 500a, 500c of the case 450 and the receiving pockets 515a, 515b on the short side walls 500b, 500d of the case 450 jointly form a holder frame that engages around the tablet computer 1 essentially on all sides, forms a stable connection between the mounting 410 and the tablet computer 1 and prevents the case 450 from peeling away from the tablet computer 1, even in the corner regions.

Figures 11A, 11B:
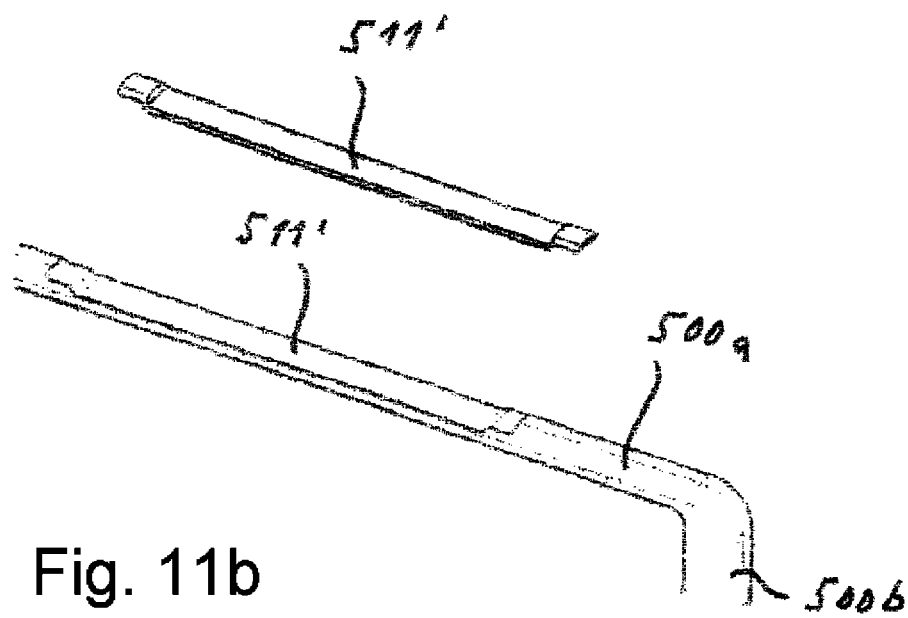
FIG. 11a shows an insertion for reinforcing recesses arranged on the longitudinal sides of the case.
FIG. 11b shows the insertion, as illustrated in FIG. 11a, inserted into the case.
Figure 21:
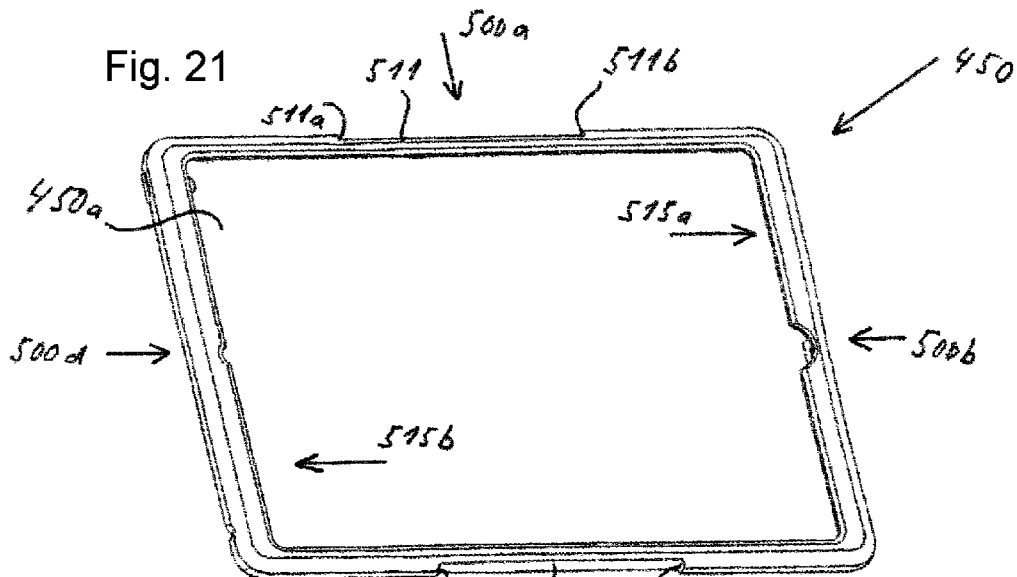
FIG. 21 shows a front perspective view of the case from FIG. 18 to FIG. 20.
Figure 22:
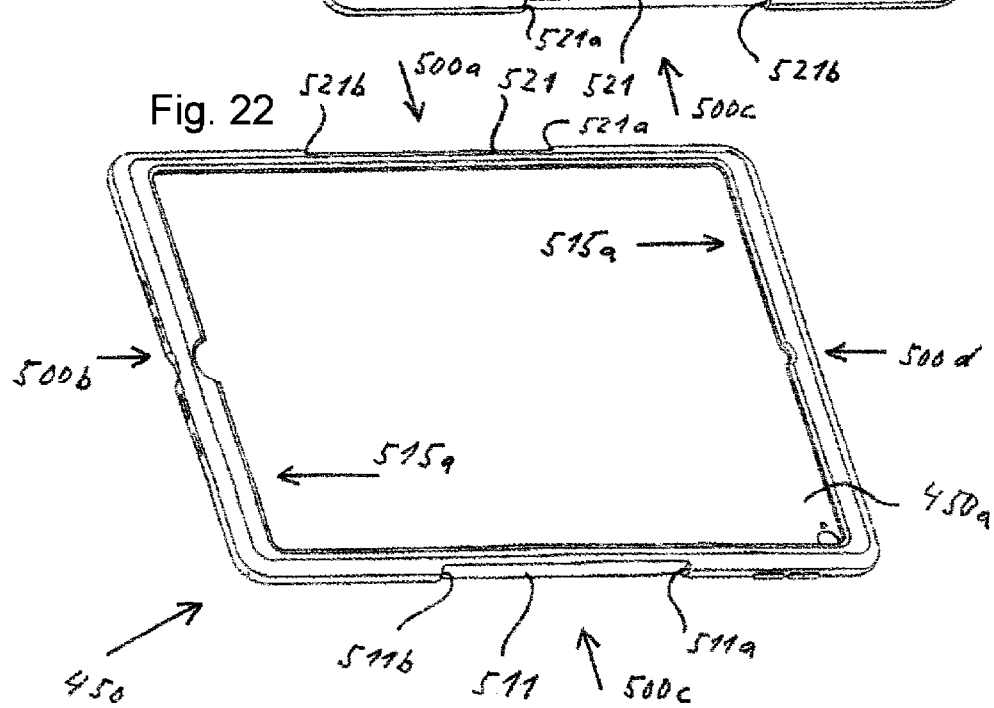
FIG. 22 shows a front perspective view of the case, as illustrated in FIG. 21, rotated by 180°.
Figure 23:
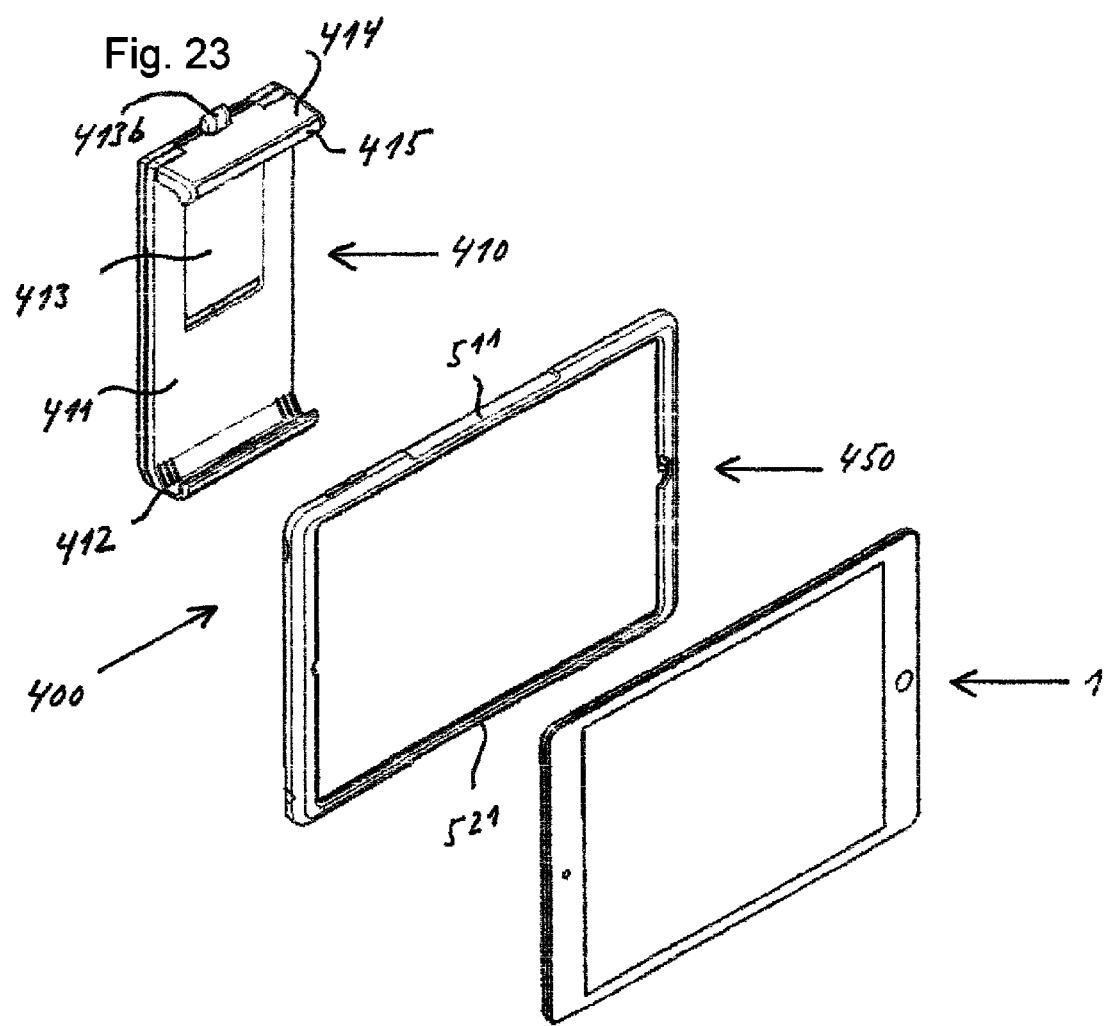
FIG. 23 shows an exploded perspective view of the holder with a mounting and a case as well as a tablet computer.
Figure 24:
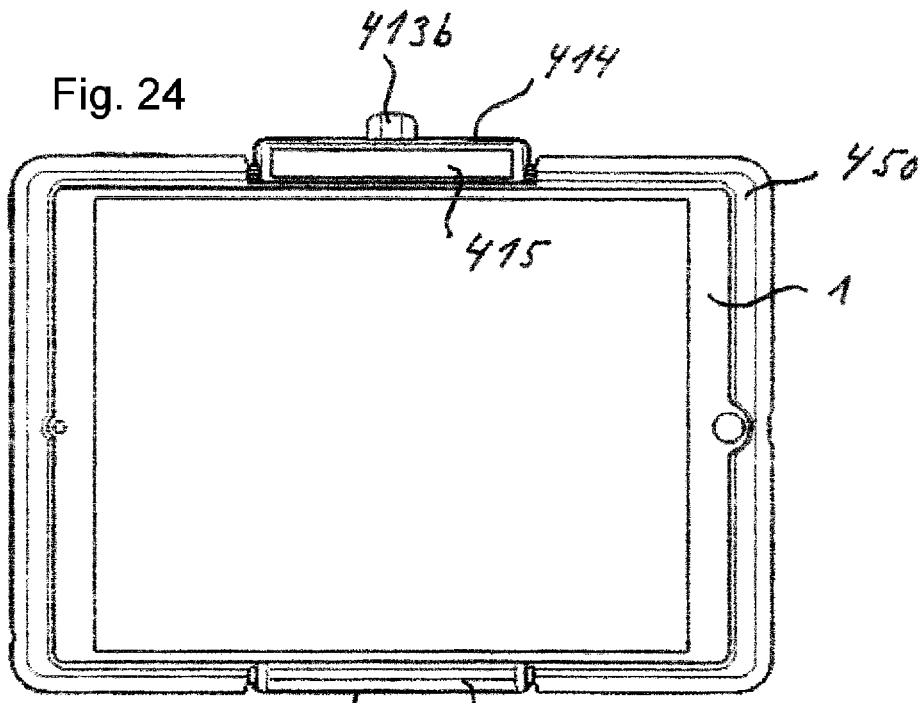
FIG. 24 shows a front view of the holder according to FIG. 23 with a tablet computer with case inserted into the mounting.

The two recesses 511, 511a, 511b and 521, 521a, 521b on the case 450 are reinforced with contour-following inserts 511' designed complementary to the recesses 511, 511a, 511b and 521, 521a, 521b and made of a stable material, such as a hard plastic (FIGS. 11a, 11b).

FIGS. 12 to 17 show a further embodiment of a mounting 410 for a tablet computer 1 in a case 450 (FIG. 9) having a carrier 411 and a holding clip 412 securely arranged on the carrier 411 that engages within the first recess 511 around an edge of the case 450 having the tablet computer 1, as well as a slide 413 adjustably mounted in the carrier 411 and securable in different positions having a fixed stop in the form of a support wall 413a that engages with the second recess 521 on the opposite edge of the case 450 of the tablet computer 1.

Arranged in the slide 413 is a holding clip 414 having a hold-down element 415. The holding clip 414 can be displaced in a linear manner, engages around the opposite edge of the case 450 of the tablet computer 1 and is spring biased with two springs 720 (FIG. 17) against the rear side of the support wall 413*a* on the slide 413.

To lift tablet computers 1 of various sizes under the hold-down elements 412*b*, 415, wedge-shaped ramps 411*f*, 411*e* (FIG. 14) that lift the tablet computer 1 inserted into the mounting 410 with case 450 until the case 450 rests against the hold-down elements 412*b*, 415 when the slide 413 and carrier 411 press against each other are arranged on the carrier 411 and on the slide 413.

The design and operating principle of the mounting 410 correspond to the description of the mountings 410 shown in the FIGS. 1*a* to 2*a* and FIGS. 5*a* to 5*b*, to which reference is made. In contrast to the latching catches shown there for locking the slide 9, 413 having a release button 9*b*, 411*b* for unlocking the slide 9, 413, which is arranged on the base plate of the slide 9, 413 or on the carrier 411, a locking device 700 is proposed in the embodiment according to FIGS. 12 to 17 that locks the movements of the slide 413 in both directions and can be released via a push button 413*b* accessible via an opening arranged on the front wall 414*b* of the holding clip 414.

The function of the locking device 700 is explained in greater detail using FIGS. 15 to 17. The slide 413 is guided in slide guides 411*k*, 411*l* (FIG. 13) in the carrier 411. Toothed rails 411*z* that are pointing toward each other are arranged on the slide guides 411*k*, 411*l*.

A push rod 701 is centrally guided in a longitudinally displaceable manner and parallel to the slide guides 411*k*, 411*l* in the base plate 414*c* of the holding clip 414. A cap-like push button 413*b*, with which the push rod 701 can be pressed inward against the force of the push rod spring 703, is attached to the outer end of the push rod 701.

Two locking bars 704, 706 guided in a movable manner transversely to the push rod 701, which are provided with control grooves 705*a*, 705*b* with which a control cam 702 attached to the push rod 701 engages, are arranged above one another in the slide 413.

The two locking bars 704, 706 are provided with toothed segments 704*a*, 706*a* on their ends oriented towards the toothed rails 411*z* that engage with the toothed rails 411*z* when the push rod 701 is in the outer inactive position.

If the push rod 701 is pushed inward with the push button 413*b*, the two locking bars 704, 706 *g* are moved toward to each other along with the control cam 702 and the toothed segments 704*a*, 706*a* are disengaged from the toothed rails 411*k*, 411*l* such that the slide 413 can be moved freely in both directions.

When the push button 413*b* is released, the two locking bars 704, 706 *g* are moved away from each other along with the control cam 702 by the force applied by the push rod spring 703 and the toothed segments 704*a*, 706*a* are engaged with the toothed rails 411*k*, 411*l* such that the slide 413 is locked in both directions.

The control grooves 705*a*, 705*b* and the control cam 702 are designed in such a way that the locking bars 704, 706 are mechanically locked in the locked position and cannot move toward to each other.

FIGS. 18 to 22 show a further embodiment of a case 450 having a bottom wall 450*a*, two long side walls 500*a*, 500*c*, two short side walls 500*b*, 500*d* as well as cover walls 515*a*', 515*b*' arranged on the short side walls 500*b*, 500*d*. The short side walls 500*b*, 500*d* and the cover walls 515*a*', 515*b*' form, together with the ends of the long side walls 500*a*, 500*c* and the ends of the bottom wall 450*a*, receiving pockets 515*a*, 515*b* open towards the interior of the case 450 that enclose the housing sections 1', 1'' (FIG. 6*a*) arranged to the side of the screen of the tablet computer 1 on all sides (FIG. 10*a*).

The recesses 511, 511*a*, 511*b* and 521, 521*a*, 521*b*, with which the clip-shaped connection elements 412, 412*a*, 412*b*, 413*a*, 414, 414*a*', 414*a*'', 415 of the mounting 410 engage (FIGS. 24 to 27), are arranged on the long side walls 500*a*, 500*c* of the case 450.

The clip-shaped connection elements 412, 412*a*, 412*b*, 413*a*, 414, 414*a*', 414*a*'', 415 on the long side walls 500*a*, 500*c* and the receiving pockets 515*a*, 515*b* on the short side walls 500*b*, 500*d* jointly form a holder frame that engages around the tablet computer 1 essentially on all sides, ensures a secure connection between the mounting 410 and the tablet computer 1 and prevents the case 450 from detaching from the tablet computer 1, even in the corner regions.

The bottom wall 450*a* is somewhat deeper on its rear side 450*a*' opposite the peripheral edge 500*a*, 500*b*, 500*c*, 500*d*. A relief-like signet 450*a*'', the height of which is in approximate alignment with the peripheral edge 500*a*, 500*b*, 500*c*, 500*d*, is attached to the recessed rear side 450*a*' of the bottom wall 450*a*.

Figure 25:
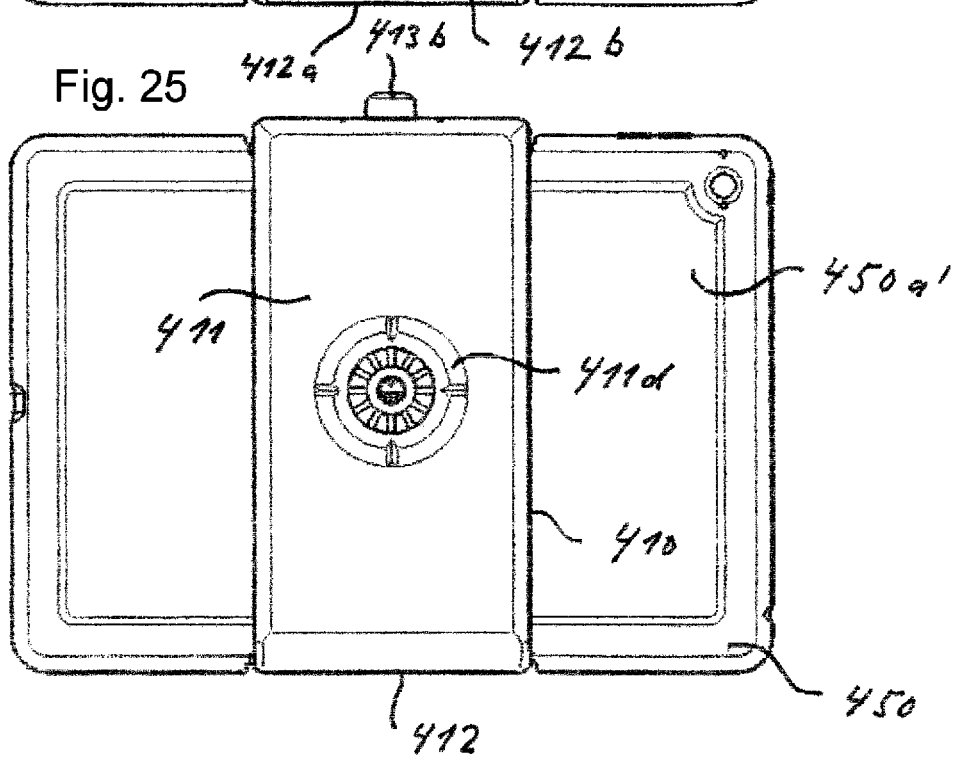
FIG. 25 shows a rear view of the holder according to FIG. 24.

FIGS. 23 to 27 show the holder 400 comprising the mounting 410 and the case 450 as well as a tablet computer 1 loose (FIG. 23) and mounted (FIGS. 24 to 27) in various views from the front (FIGS. 24 and 27) and from the rear (FIGS. 25 and 26).

Figure 28:
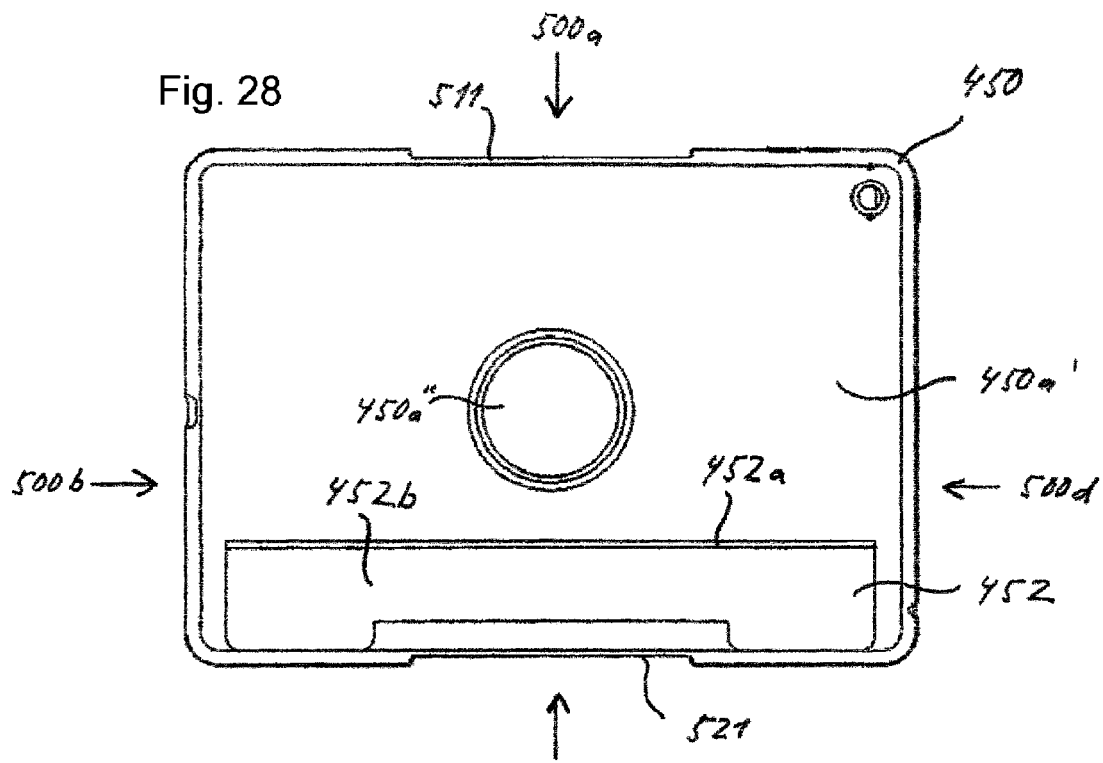
FIG. 28 shows a rear view of a further variant of a case having a folded support strip.
Figure 29:
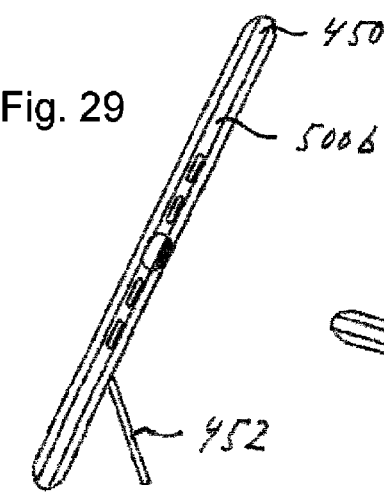
FIG. 29 shows a side view of the case from FIG. 28 with the support strip folded out in a first position.
Figure 30:
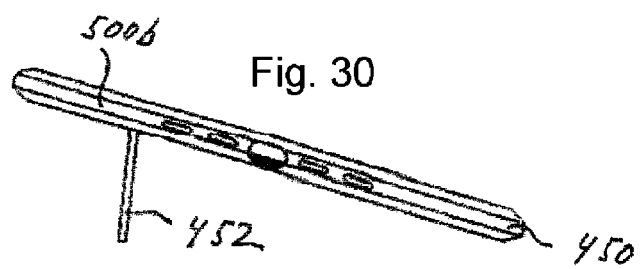
FIG. 30 shows a side view of the case from FIG. 28 with the support strip folded out in a second position.

FIGS. 28 to 30 show an embodiment variant of the case 450. A support strip 452, which can be folded out about an axis of rotation 452*a* parallel to the long side walls 500*a*, 500*c* and by means of which the case 450 having the tablet computer 1 can be placed on a flat surface in various slanted positions, is arranged on the rear side 450*a*' of the bottom wall 450*a*. In the collapsed non-use position, the external side 452*b* of the support strip 452 is in approximate alignment with the peripheral edge 500*a*, 500*b*, 500*c*, 500*d* of the case 450.

Figure 31:
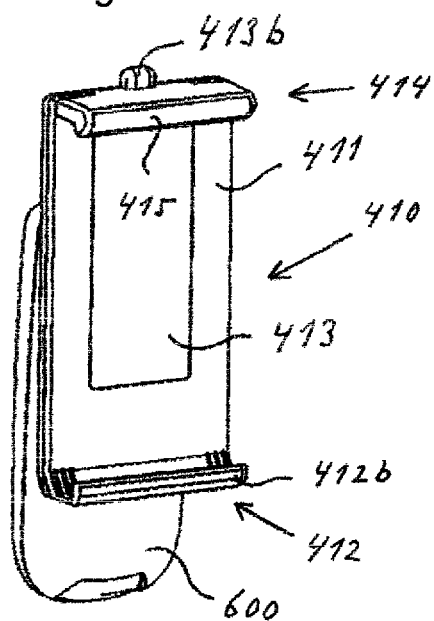
FIG. 31 shows a front perspective view of a further embodiment of a mounting, which is rotatably arranged on a support element of an attachment device, in a vertical position with the slide in a retracted position.
Figure 32:
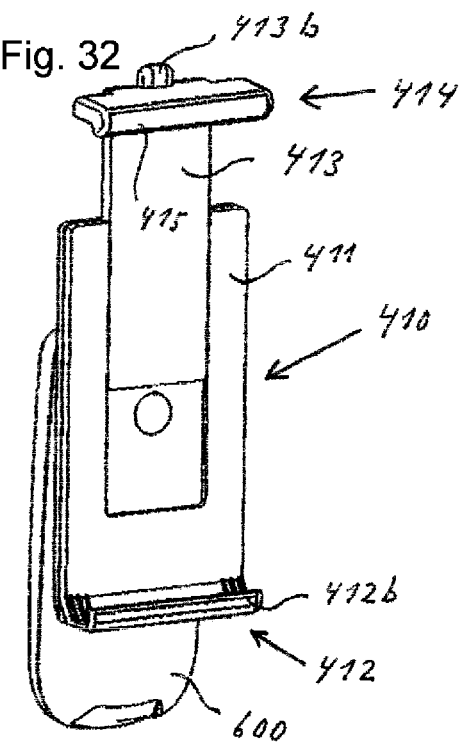
FIG. 32 shows a view of the mounting, as illustrated in FIG. 31, with the slide in an extended position.

FIGS. 31 to 32 show a mounting 410 that is arranged in a rotatable manner on a support element 600 of an attachment device such that a tablet computer 1 with case 450 can be rotated from a portrait position to a landscape position and vice versa.

The mounting 410 comprises a carrier 411 having a firmly attached holding clip 412 and a slide 413 that can be displaced in a linear manner in the carrier 411 having a movable holding clip 414 having a hold-down element 415.

The mounting 410, differs from the manner of operation of the mounting 410 already described above in that the slide 413 has a larger adjustment path that is attained by extension of the slide 413 and slide guide in the carrier 411.

The distance between the holding clips 412 and 414 can be adjusted between a minimum distance (FIG. 31) and a maximum distance (FIG. 32). The result is the minimum and maximum dimensions of the tablet computers 1 that can be held in the mounting 410 along with the case 450.

Figure 33:
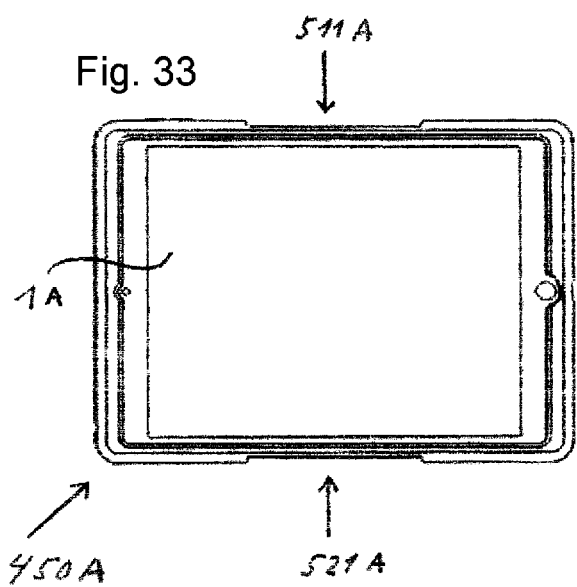
FIG. 33 shows a front view of a tablet computer with case in landscape position and connection elements in the form of recesses on the two long edges of the case.
Figure 34:
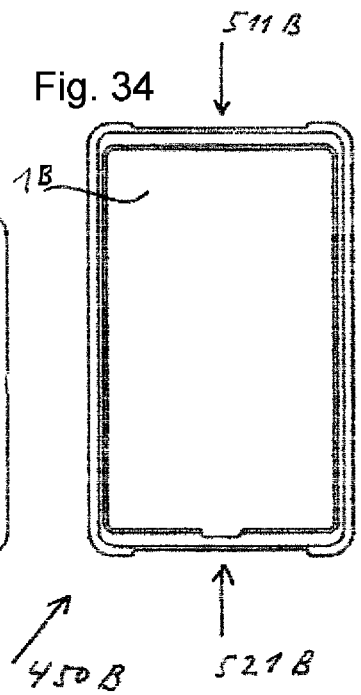
FIG. 34 shows a front view of a tablet computer with case in portrait position and connection elements in the form of recesses on the two short edges of the case.

FIGS. 33 and 34 show two different-sized tablet computers 1A, 1B having different-sized cases 450A, 450B. On the case 450A, the recesses 511A, 521A for the holding clips 412, 414 are arranged in the middle of the two longitudinal sides. On the case 450B, the recesses 511B, 521B for the holding clips 412, 414 are arranged in the middle of the two narrow sides.

This makes it possible to insert a tablet computer 1B with case 450B whose width exceeds the minimal distance between the holding clips 412 and 414 of the mounting 410 lengthwise into the mounting 410. Thanks to the option of rotating the mounting 410 from portrait to landscape mode, it does not matter whether the recesses 511A, 521A and 511B, 521B for the holding clips are arranged on the two longitudinal or narrow sides of the cases 450A, 450B.

FIGS. 35 to 38 show that, regardless of which sides of the cases 450A, 450B the recesses 511A, 521A and 511B, 521B are arranged, the different-sized tablet computers 1A, 1B can be used both in portrait mode and in landscape mode in the same mounting 410.

FIGS. 39 to 40 show a further embodiment of a mounting 410 with which a wide range of different-sized tablet computers 1A, 1B with cases 450A, 450B can be covered with a compact design.

A holding clip 630, 630a, 630b and a slide 620 having a support wall 622 are arranged above one another in a carrier 610 open on two opposite sides and can be moved into the extended positions shown in FIGS. 39 and 40. The holding clip 630, 630a, 630b and the slide 620 are provided with toothed racks 621, 631 according to a known design, can be moved in a synchronous manner and in opposite directions via a gear 635 and can be secured in a desired position that is adapted to the dimensions of a case 450A, 450B having a tablet computer 1A, 1B.

The holding clip 630, 630a, 630b engages around the tablet computer 1A, 1B at one edge. A holding clip 625 biased against the support wall 622 that engages around the tablet computer 1A, 1B with cases 450A, 450B according to the previously described manner of operation is arranged on the slide 620.

FIG. 41 shows a cross-sectional detailed view of the case 450A with a tablet computer 1A inserted, as illustrated in FIG. 33, in the area of the recess 511A.

FIG. 42 shows a cross-sectional detailed view of the mounting 410 with a tablet computer 1A with case 450A inserted, as illustrated in FIG. 35, in the area of the holding clip 414.

The slide 413 that is linearly guided in the carrier 411 is connected to the support wall 413a by means of the ramp 411e.

In the slide 413, the holding clip 414 is linearly guided with the front wall 414b and the hold-down element 415 and biased against the support wall 413a of the slide 413. The push rod 701 having the push button 423b for unlocking the slide 413 is mounted in the bottom wall 414c of the holding clip 414 (FIGS. 15-17).

As shown in FIGS. 12 to 14 and described, a tablet computer 1A with case 450A inserted into the mounting is lifted via the wedge-shaped ramps 411f and 411e arranged on the carrier 411 and on the slide 413 until the upper side of the case 450A rests against the lower side of the hold-down elements 412b, 415 when the slide 413 and carrier 411 press against each other. This ensures that the case 450A and the tablet computer 1A are clamped between the ramps 411f, 411e and the hold-down elements 412b, 415 in such a way that the case 450A cannot come out of the mounting 410 and the tablet computer 1A cannot come out of the case 450A.

The edge of the case 450A of the tablet computer 1A is enclosed and supported on all sides by the ramp 411e as well as the support wall 413a and the hold-down element 415. To remove the tablet computer 1A from the mounting 410 along with the case 450A, the holding clip 414 is pressed outward until it no longer covers the case 450A.

Figure 43:
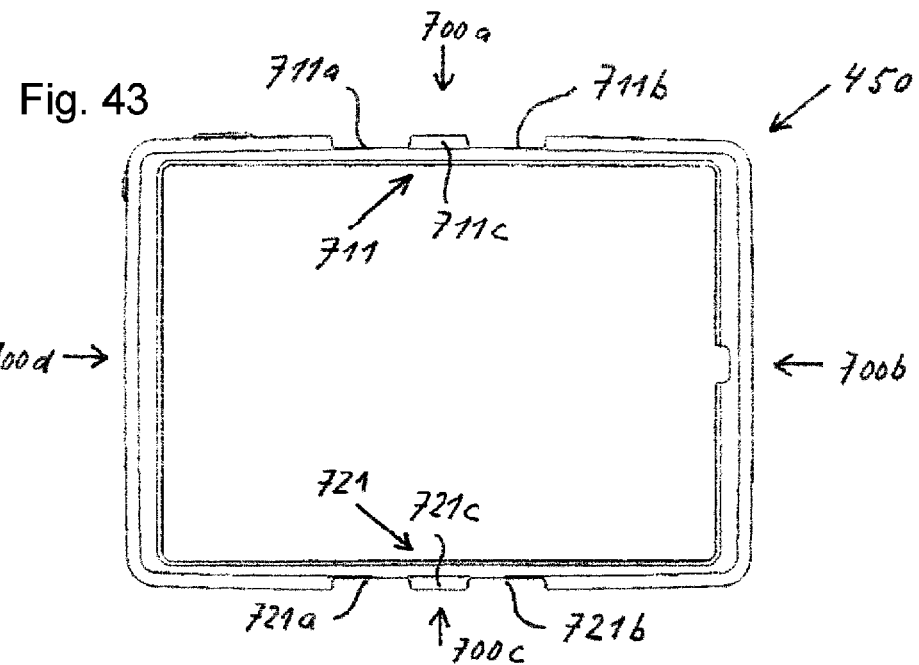
FIG. 43 shows a top view of the front side of a case having an alternative design of the second connection elements on the two longitudinal edges.
Figure 44:
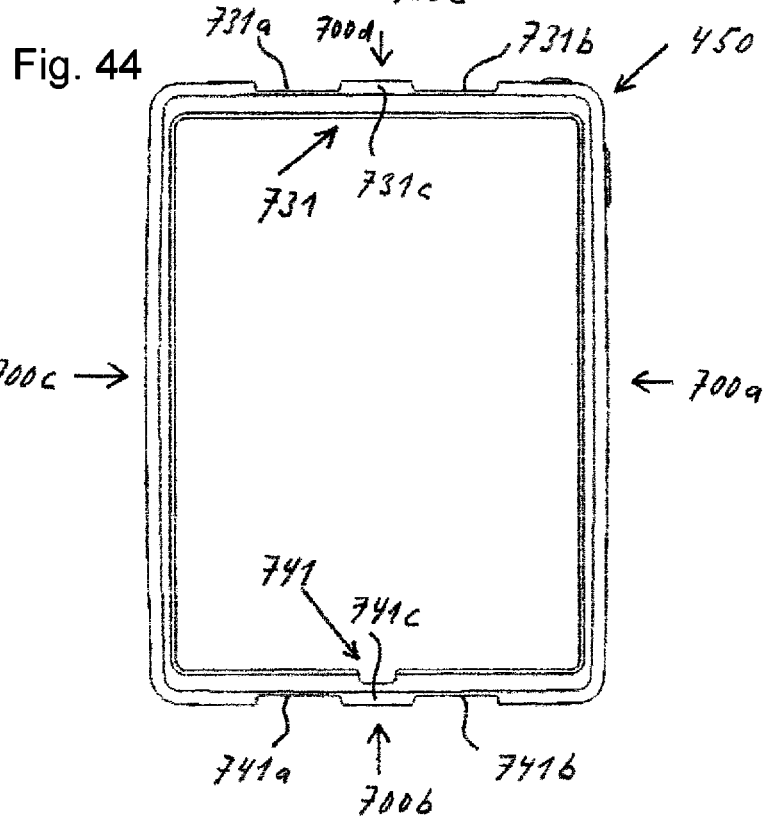
FIG. 44 shows a top view of the front side of a case having an alternative design of the second connection elements on the two transverse edges.
Figure 45:
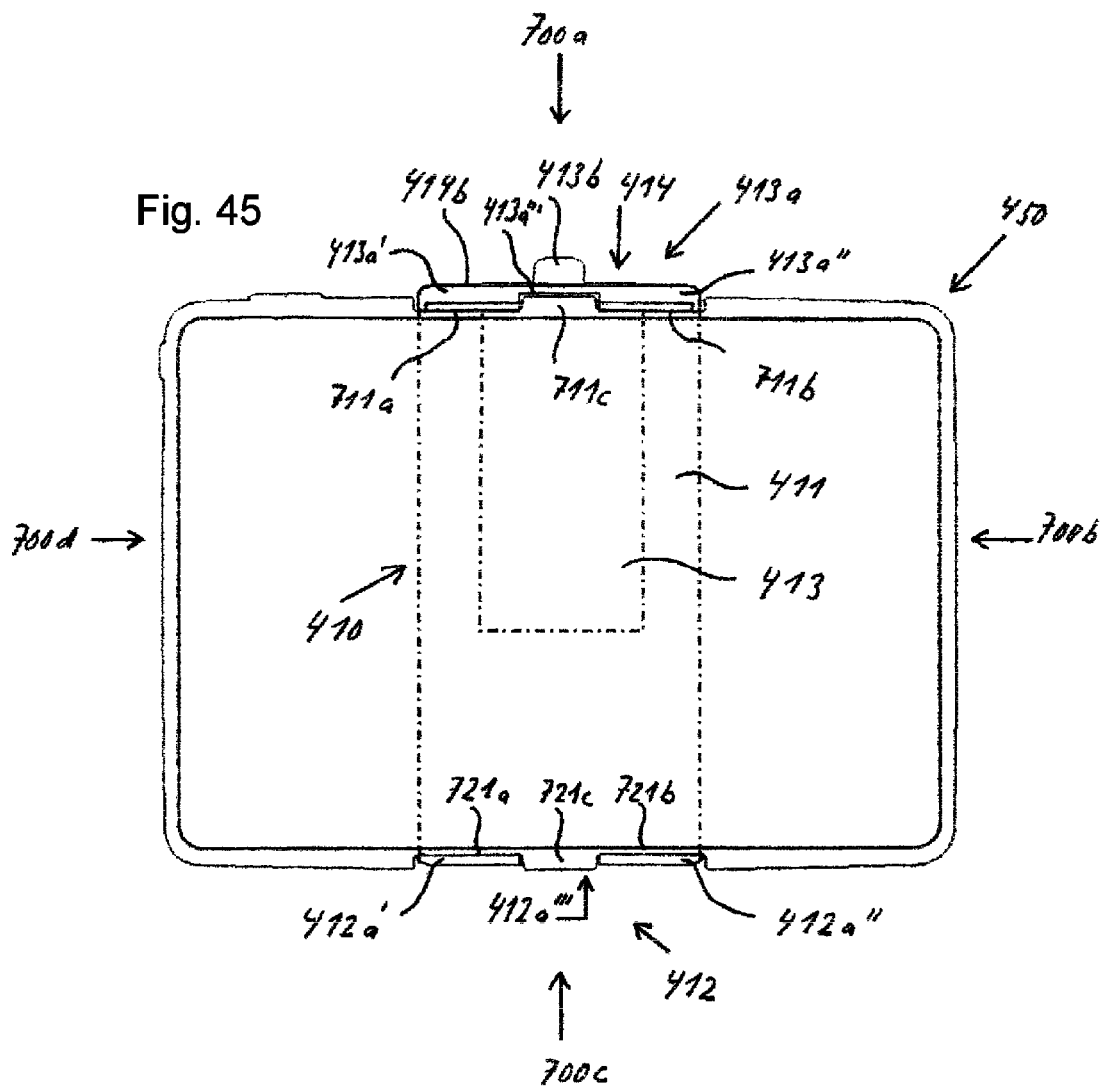
FIG. 45 shows a partially sectional top view of the front side of the case, as illustrated in FIG. 43, with a mounting (partially sectional) adapted to the connection elements.

FIGS. 43 to 45 show two cases 450 having an alternative design for the second connection elements 711, 721, 731, 741 as well as a mounting 410 having accordingly adapted first connection elements 412, 413a.

The second connection elements 711, 721 are arranged in the center of the two longitudinal sides 700a, 700c on the case 450 shown in FIG. 43. The second connection elements 731, 741 are arranged in the center of the two narrow sides 700b, 700d on the case 450 shown in FIG. 44.

The second connection elements 711, 721, 731, 741 comprise a central tooth 711c, 721c, 731c, 741c as well as recesses 711a, 711b, 721a, 721b, 731a, 731b, 741a, 741b arranged on both sides of the central tooth 711c, 721c, 731c, 741c.

Arranged on the holding clip 412 of the carrier 411 and the support wall 413a of the slide 413 are first connection elements 413a', 413a'', 413a''', 412a', 412a'', 412a''' designed complementary to the second connection elements 711, 721, 731, 741 that engage with the second connection elements 711a, 711b, 711c, 721a, 721b, 721c arranged on the case 450 and together with them form positive-locking teeth that prevent the case 450 from sliding sideways in the mounting 410.

FIGS. 46a and 46b show a one-piece holder frame 500 from the front (FIG. 46a) and from the rear (46b). The second connection elements 511, 511a, 511b and 521, 521a, 521b designed as recesses having lateral stops are arranged in the middle of the two longitudinal sides 510, 520 of the holder frame 500.

FIGS. 47a and 47b show a two-piece holder frame 500A, 500B from the front (FIG. 47a) and from the rear (FIG. 47b). The second connection elements 511, 511a, 511b and 521, 521a, 521b designed as recesses having lateral stops are arranged in the middle of the longitudinal sides 510, 520 of the two holder frames 500A, 500B. The two holder frames 500A, 500B are reinforced with bottom walls 510a, 510b on the rear side.

Figure 48:
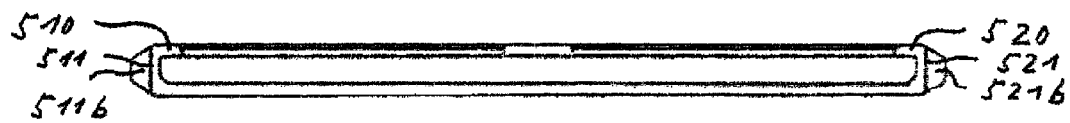

FIG. 48 shows a cross-section of the one-piece holder frame 500 as illustrated in FIG. 46a.

Figure 49:
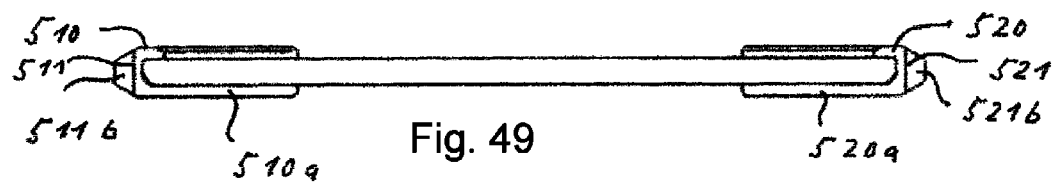

FIG. 49 shows a cross-section of the two-piece holder frame 500A, 500B as illustrated in FIG. 47a.

Figure 50A:
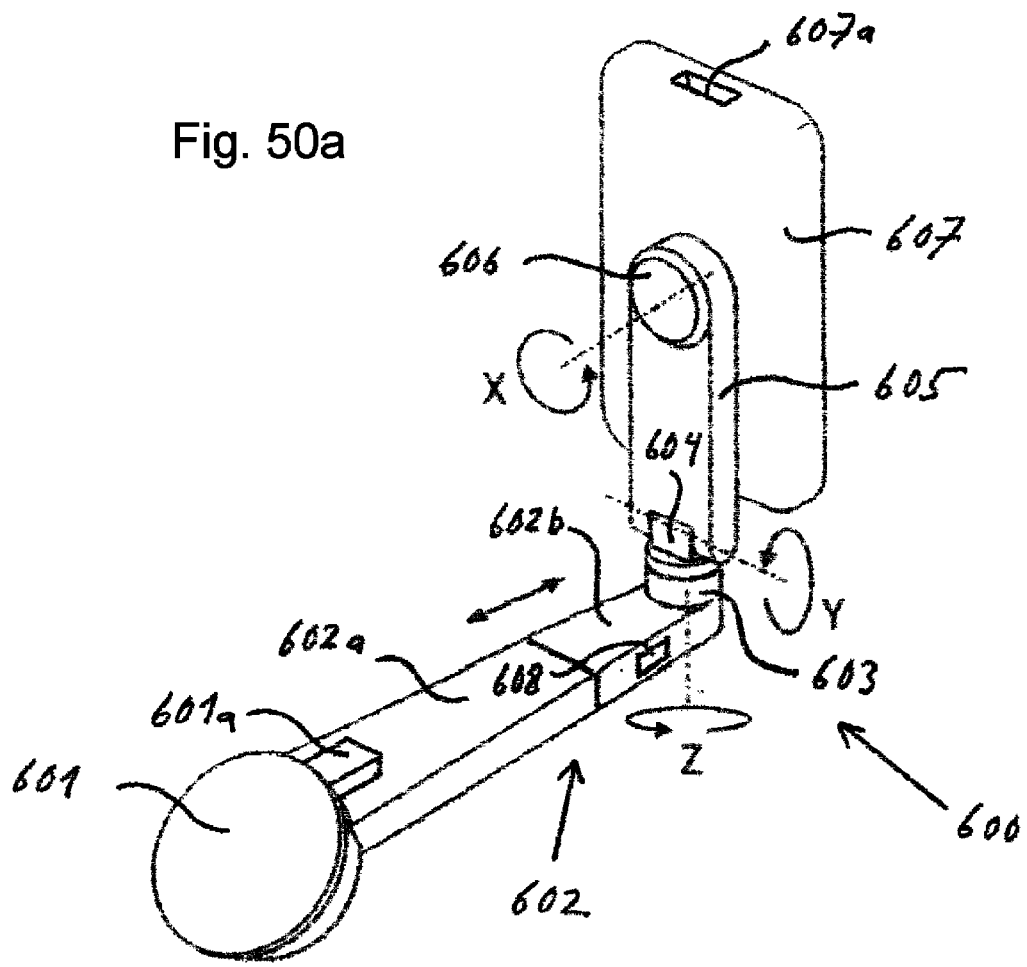
FIG. 50a shows a first embodiment of a smartphone holder for attachment to a windshield of a motor vehicle having a vacuum suction cup in a vertical upright position and a screen facing the driver.
Figure 50B:
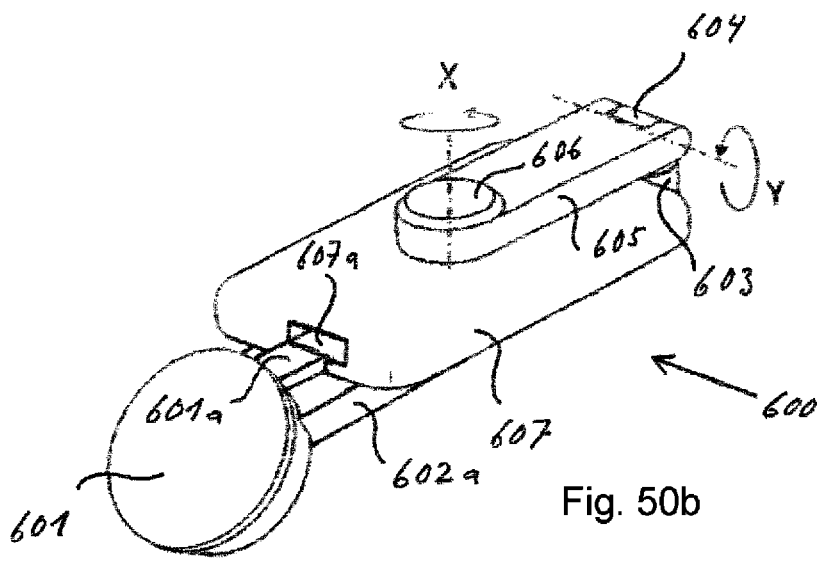
FIG. 50b shows the smartphone holder, as illustrated in FIG. 50a, in a horizontal non-use position having a screen facing the support arm.
Figure 51:
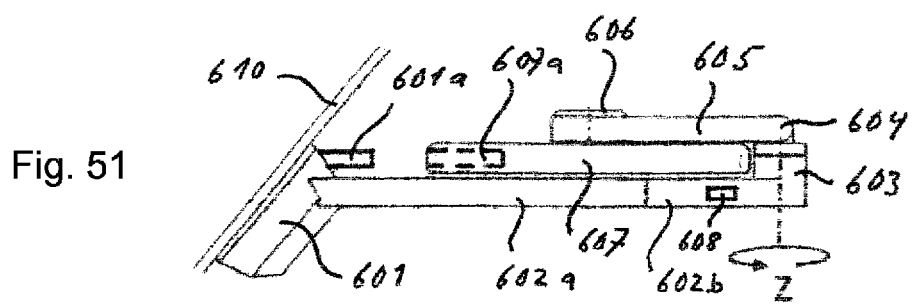
FIG. 51 shows a side view of the smartphone holder, as illustrated in FIG. 50b, attached to a windshield of a motor vehicle.

FIGS. 50a to 51 show a first application example with an attachment device in the form of a vacuum suction cup 601 for attaching the holder 600 to the inside of a windshield 610 of a motor vehicle.

A support arm 602 that is positioned roughly horizontally toward the passenger compartment is attached to the vacuum suction cup 601. The support arm 602 comprises a first segment 602a firmly connected to the vacuum suction cup 601 in which a second segment 602b is guided in a linearly extendable manner. Using a latching device (not shown), the second segment 602b can be secured in the desired extended position and released with release buttons 608 arranged on both sides on the side walls of the second segment 602b.

A first pivot bearing 603, on which a bearing block 604 is mounted such that it can be rotated 360° about a vertical axis of rotation Z, is arranged on the front end of the second segment 602b.

A second pivot bearing, on which a support element 605 is mounted such that it can be rotated about a horizontal axis of rotation Y between an approximately horizontal and approximately vertical position, is arranged on the bearing block 604.

A third pivot bearing 606, on which a mounting 607 for receiving a device (1, 1A, 1B, 1a) is mounted in such a way that it can be rotated 360° about an axis of rotation X positioned vertically relative to the broad side of the mounting 607, is arranged on the upper end of the support element 605.

All three pivot bearings can be releasably locked in preferred positions. When the device (1, 1A, 1B, 1a) is not used, the mounting 607 can be set down horizontally onto the support arm 602 with the screen of the device (1, 1A, 1B, 1a) pointed toward the upper side of the support arm 602

(FIG. 50b and FIG. 51) such that the screen of the device (1, 1A, 1B, 1a) is protected against contamination, damage and exposure to sunlight and the view of the road is restricted to a minimum extent.

To use the device (1, 1A, 1B, 1a), the mounting 607 on the second segment 602b can be pulled out of the first segment 602a to such an extent that the mounting 607 having the device (1, 1A, 1B, 1a) can be moved from the horizontal non-use position about the axis of rotation Y into an approximately upright use position without colliding with the windshield 610 and the screen of the device (1, 1A, 1B, 1a) can be pointed toward the user about the axes of rotation Y and Z (FIG. 50a).

On the third pivot bearing 606, the mounting 607 having the device (1, 1A, 1B, 1a) can be rotated between portrait and landscape positions and the opening 607 for the charging socket of the device (1, 1A, 1B, 1a) can be aligned with the charging plug 601a arranged on the first segment 602a or on the vacuum suction cup 601 when the mounting 607 is in the horizontal non-use position. By pushing the second segment 602b, the charging plug 601a can be coupled with the charging socket of the device (1, 1A, 1B, 1a) or decoupled from it through the opening 607a (FIGS. 50b and 51).

The mounting 607 for receiving the device (1, 1A, 1B, 1a) can be designed according to any of the previously described embodiments.

Figure 52:
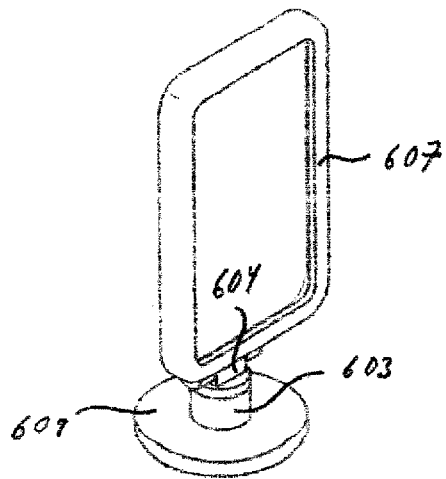
FIG. 52 shows a smartphone holder according to the design of FIGS. 50a to 51 having a stand base for attaching the holder to a flat surface.
Figure 53:
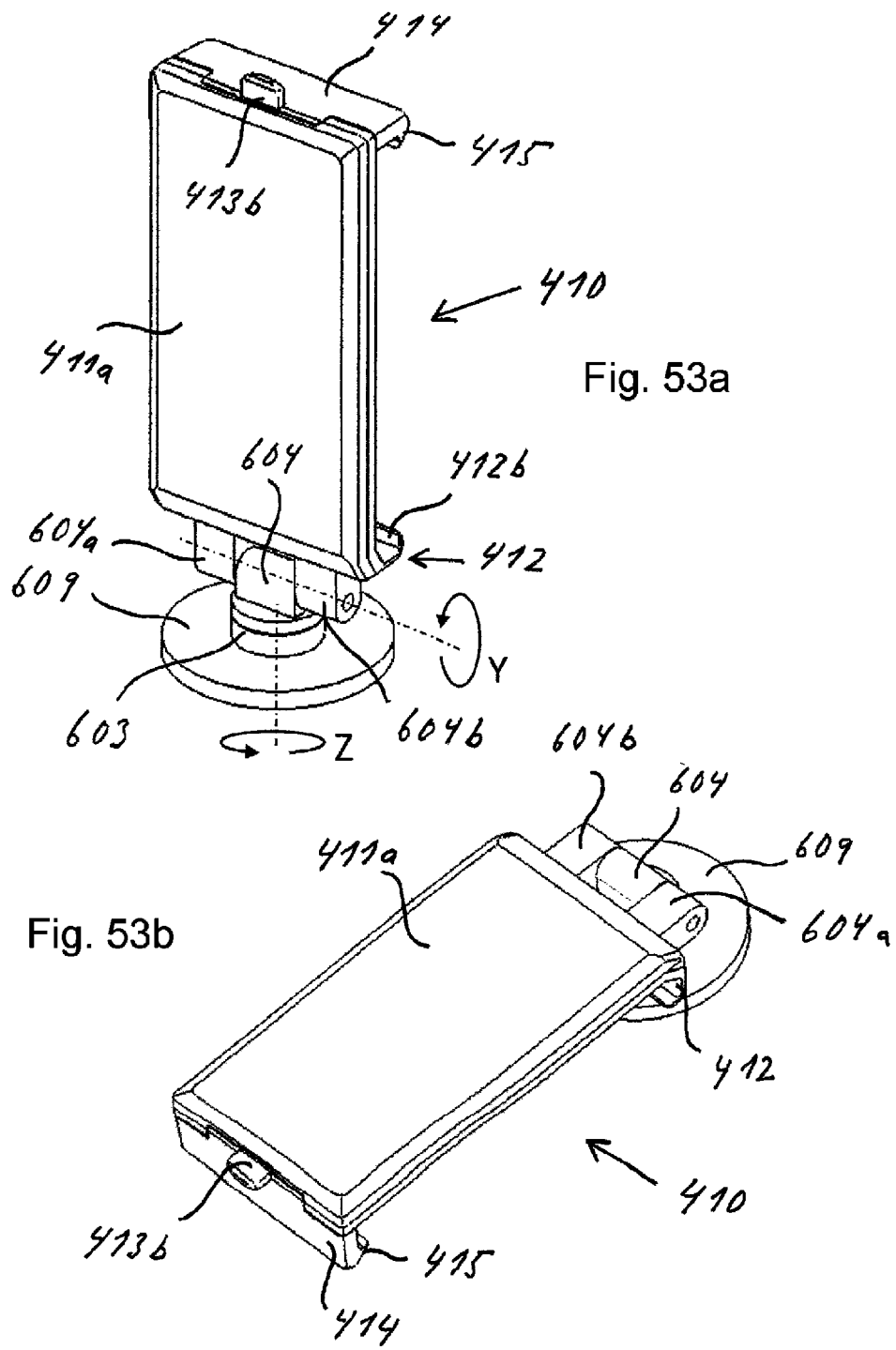
FIG. 53a shows a perspective view of a further embodiment of a mounting in the use position.
FIG. 53b shows the holder according to FIG. 53a in the non-use position.
Figure 59A:
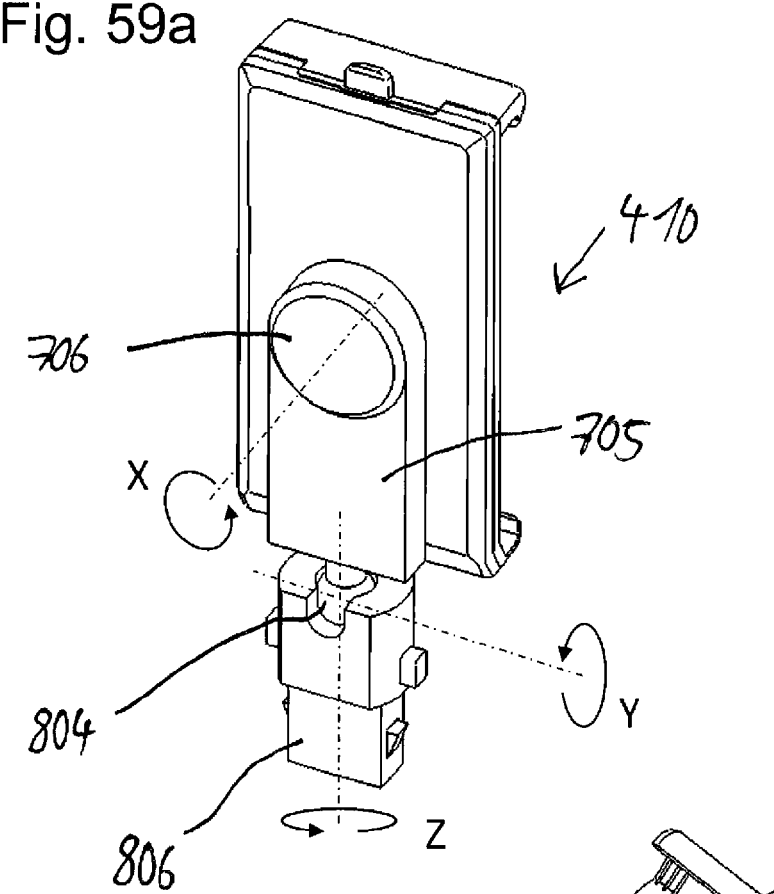
FIG. 59a shows a perspective view of a further embodiment of a holder in the use position.
Figure 59B:
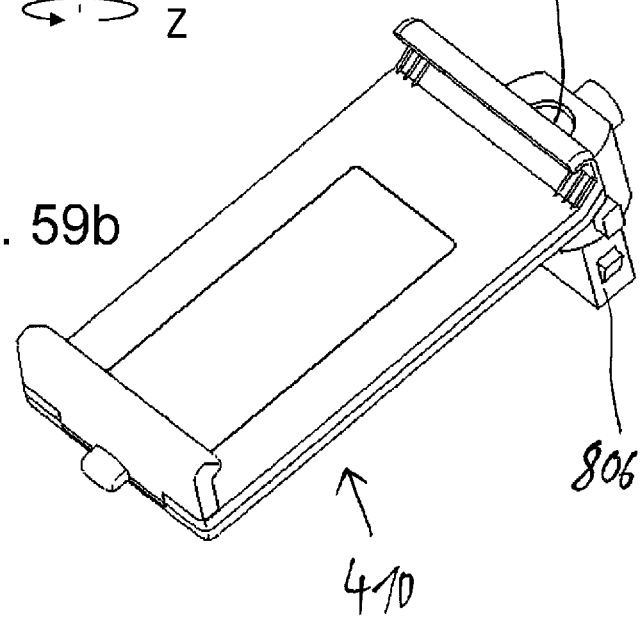
FIG. 59b shows the holder according to FIG. 59a in the non-use position.

FIG. 52 shows a variant of the embodiment of the holder 600 shown in FIG. 50a to FIG. 51. In the variant shown in FIG. 52, the first pivot bearing 603 is arranged on a base 609, which can be attached to a flat area such as, for example, the cover of an instrument panel, by means of adhesives or screws, instead of a support arm 602 attached to the windshield 610 by means of a vacuum suction cup 601.

In a further variant, the embodiment of the holder 600 shown in FIG. 50a to FIG. 51 having a plug connection with a connector element and a receiving socket can be secured to a component of a motor vehicle, such as a center console.

FIGS. 53a to 55b show a further application example of the holder 400 having an attachment device in the form of a base 609, which can be attached to a flat area such as, for example, the cover of an instrument panel, by means of adhesives or screws.

As in the case of the embodiment shown in FIG. 52, a first pivot bearing 603, which allows the mounting 410 to be rotated 360° about a vertical axis of rotation Z, is arranged on the base 609.

Arranged on the pivot bearing 603 is a bearing block 604 that, together with the fork ends 604a, 604b arranged on the carrier 411, forms a second pivot bearing that makes it possible to tilt the mounting 410 approximately 90° on both sides about a horizontal axis of rotation Y.

As in the embodiments shown in FIG. 50a to FIG. 52, this makes it possible for the mounting 410 to swing out of a vertical or slanted use position and into a horizontal non-use position, which greatly reduces any impairment of vision when the mounting 410 is attached within the view of the driver.

To protect against dirt or damage, it is also possible to rotate the mounting 410 in such a way that the screen points downward in the non-use position.

The design and function of the mounting 410 as well as the case 450 for receiving a device (1, 1A, 1B, 1a) otherwise correspond to the previously described embodiments, to which reference is made. For better understanding, the reference numbers used there have been retained.

FIGS. 56a to 58b show a further embodiment of the mounting 410 as illustrated in FIGS. 53a to 55b.

A support element 705 is additionally provided between the bearing block 604 and mounting 410. A third pivot bearing 706, on which the mounting 410 is mounted in such a way that it can be rotated 360° about an axis of rotation X positioned vertically relative to the broad side of the mounting 410, is arranged on the upper end of the support element 705, as shown in the embodiment according to FIGS. 50a to 52.

FIGS. 59a to 61b show a further embodiment of the mounting 410 as illustrated in FIGS. 56a to 58b. Instead of a base 609 having the double joint 604, a connector element 806 having a ball head 804. The connector element 806 can be arranged in a receiving socket 808 (FIG. 60) or on a dashboard cover 810.

It should be understood that, unless stated otherwise herein, any of the features, characteristics, alternatives or modifications described regarding a particular embodiment herein may also be applied, used, or incorporated with any other embodiment described herein. Also, the drawings herein are not drawn to scale.

Although the invention has been described and illustrated with respect to exemplary embodiments thereof, the foregoing and various other additions and omissions may be made therein and thereto without departing from the spirit and scope of the present invention.

The invention claimed is:

1. A holder for releasably securing a flat, approximately rectangular device, such as a tablet computer or a smartphone, to a component of a motor vehicle, the holder comprising a mounting which can be secured to the component and a holder frame which can be releasably secured to the mounting for receiving the device, the mounting comprising a carrier having first connection elements, characterized in that the holder frame has at least two second connection elements at two opposite edges of the holder frame, the first and second connection elements being designed in a complementary manner with respect to each other such that the first connection elements and the second connection elements interlock for the purpose of mutual fixing when the holder frame is inserted into the mounting such that the holder frame cannot be moved out of the mounting in the holder frame plane and/or perpendicularly to the holder frame plane;
wherein the mounting comprises two first connection elements arranged on opposite sides of the mounting, the spacing thereof being adjustable and thus adaptable to holder frames or cases having various external dimensions for devices of various dimensions; and
wherein each of the first connection elements is configured to engage a second connection element of the at least two second connection elements of the holder frame to releasably secure the holder frame to the mounting.

2. The holder according to claim 1, characterized in that the holder frame is designed as a U-shaped profile made from an elastic material, such as silicone or TPU, that encloses the edge of the device on all sides.

3. The holder according to claim 1, characterized in that the holder frame has a two-part design, one second connection element being arranged on each holder frame part.

4. The holder according to claim 1, characterized in that the holder frame is part of a case that receives the device having a bottom wall and side walls that enclose the device on all sides.

5. The holder according to claim 4, characterized in that the case comprises cover walls on at least two opposite sides, the cover walls at least partially covering the device in the peripheral area along the sides of the screen.

6. The holder according to claim 5, characterized in that the case has receiving pockets on two opposite sides that open towards the interior of the case and enclose two opposite edges of the device on all sides.

7. The holder according to claim 6, characterized in that the second connection elements are arranged on the two long edges of the case and the receiving pockets are arranged on the two short edges of the case.

8. The holder according to claim 6, characterized in that the receiving pockets are arranged on the two long edges of the case and the second connection elements are arranged on the two short edges of the case.

9. The holder according to claim 4, characterized in that the case is made as one piece from an elastic material, such as silicone or TPU.

10. The holder according to claim 9, characterized in that the second connection elements are formed on the edges of the holder frame or of the case from the holder frame or of the case or are arranged as separate parts on the holder frame or case.

11. The holder according to claim 10, characterized in that the second connection elements are designed as recesses and/or protrusions and form lateral stops for the first connection elements.

12. The holder according to claim 11, characterized in that the first connection elements and the second connection elements are designed as interlocking teeth.

13. The holder according to claim 12, characterized in that the recesses and/or protrusions or teeth are arranged on faces and/or in an edge region of a front and/or rear side of the holder frame or case.

14. The holder according to claim 4, characterized in that the second connection elements are arranged approximately centrally on the edges of the holder frame or case.

15. The holder according to claim 1, characterized in that the second connection elements are designed symmetrically and have identical contours.

16. The holder according to claim 1, characterized in that the two first connection elements are clip-shaped and comprise a first holding clip having a hold-down element and a second holding clip having a hold-down element that engage with the second connection elements and/or engage around the second connection elements.

17. The holder according to claim 16, characterized in that the second connection elements are designed as recesses having lateral stops with which the first holding clip and the second holding clip engage.

18. The holder according to claim 4, characterized in that the edge of the device outside of the second connection elements is covered by a protective edge arranged on the holder frame or on the case.

19. The holder according to claim 16, characterized in that the first holding clip is arranged securely on the carrier and the second holding clip is arranged on an extendable slide mounted in or on the carrier.

20. The holder according to claim 19, characterized in that the slide is mounted in an adjustable manner parallel to the longitudinal axis of the carrier and can be secured in different positions with a locking device.

21. The holder according to claim 19, characterized in that the locking device can be released with a push button that is accessible on a front wall of the second holding clip.

22. The holder according to claim 19, characterized in that a support wall that forms a fixed stop for the device with holder frame or case is arranged on the end of the slide facing away from the first holding clip.

23. The holder according to claim 22, characterized in that the second holding clip is movably mounted in or on the slide parallel to the longitudinal axis and biased with a spring against the support wall such that the hold-down element of the holding clip extends beyond the support wall and covers the edge of the holder frame or case with the device inserted into the mounting.

24. The holder according to claim 19, characterized in that wedge-shaped ramps, which lift the device with holder frame or case that is inserted into the mounting until the holder frame or case rests against the two hold-down elements when the slide and carrier press against each other, are arranged on the carrier and on the slide.

25. The holder according to claim 16, characterized in that a rear wall of the first holding clip and the hold-down element of the first holding clip and the support wall as well as the hold-down element of the second holding clip engage around the recesses on the holder frame or on the case having the device.

26. The holder according to claim 24, characterized in that the ramp, the rear wall of the first holding clip and the hold-down element of the first holding clip on one edge and the ramp, the support wall and the hold-down element of the second holding clip on the opposite edge in the area of the recesses engage around the holder frame or case having the device and support the device on all sides.

27. The holder according to claim 1, characterized in that the mounting can be connected to the component via a releasable coupling having a connector element on the mounting and a receiving socket on the component.

* * * * *